US012750317B2

(12) United States Patent

Pithewan et al.

(10) Patent No.: US 12,750,317 B2

(45) Date of Patent: Sep. 29, 2026

(54) NETWORK STACK FOR TRANSMISSION OF APPLICATION DATA OVER NETWORK CONNECTIONS

(71) Applicant: Roblox Corporation, San Mateo, CA (US)

(72) Inventors: Khuzema Pithewan, San Mateo, CA (US); Michael White, San Mateo, CA (US); Ethan Everett, San Mateo, CA (US)

(73) Assignee: Roblox Corporation, San Mateo, CA (US)

(*) Notice: Subject to any disclaimer, the term of this patent is extended or adjusted under 35 U.S.C. 154(b) by 29 days.

(21) Appl. No.: 18/734,930

(22) Filed: Jun. 5, 2024

(65) Prior Publication Data

US 2025/0379826 A1 Dec. 11, 2025

(51) Int. Cl.
*H04L 47/2475* (2022.01)

(52) U.S. Cl.
CPC ................................ *H04L 47/2475* (2013.01)

(58) Field of Classification Search
CPC ..... H04L 67/12; H04L 1/0041; H04L 1/0002; H04L 1/18; H04L 5/0064; H04L 67/1097; H04L 67/306; H04L 1/0009; H04L 1/1874; H04L 1/0076; H04L 1/1854; H04L 1/0057; H04L 67/565; H04L 69/163; H04L 69/164; H04L 12/66; H04L 43/045; H04L 47/122; H04L 69/00; H04L 67/125; H04L 67/02; H04L 67/535; H04L 67/10; H04L 67/562;

(Continued)

(56) References Cited

U.S. PATENT DOCUMENTS 6,064,678 A * 5/2000 Sindhushayana ..... H04L 1/0018 370/332

7,272,150 B2 * 9/2007 Bly ......................... H04L 47/22 370/414

(Continued)

OTHER PUBLICATIONS

"Socketpair.c," Retrieved from Internet: https://github.com/curl/curl/blob/master/lib/socketpair.c, 2024, 3 pages.

(Continued)

*Primary Examiner* — Djenane M Bayard

(74) *Attorney, Agent, or Firm* — IP Spring

(57) ABSTRACT

Implementations described herein relate to methods, systems, and computer-readable media. In some implementations, a method to transmit application data over a network connection may include receiving application data, determining a permitted data rate, shaping the application data received from each application of the plurality of applications based on the permitted data rate for the application into respective shaped application data, adding the shaped application data associated with each application to a queue, assigning the datagrams included in the queue to a particular data stream of a plurality of data streams based on metadata associated with each datagram included in the application data, applying stream level flow control to each data stream of the plurality of data streams to identify a subset of datagrams from the each data stream in the queue, generating a packet for transmission over the connection, and transmitting the packet over the network connection.

20 Claims, 9 Drawing Sheets

(58) Field of Classification Search
CPC ..... H04L 67/566; H04L 45/302; H04L 45/74; H04L 69/16; H04L 69/162; H04L 69/165; H04L 47/50; H04L 47/2433; H04L 47/6275; H04L 49/25; H04L 12/46; H04L 12/56; H04L 12/4625; H04L 47/821; H04L 12/10; H04L 47/76; H04L 69/22; H04L 2012/5679; H04L 47/10; H04L 47/6215; H04L 47/2441; H04L 47/22; H04L 2012/5651; H04L 47/30; H04L 47/20; H04L 47/32; H04L 47/623; H04L 12/5601; H04L 12/5602; H04L 49/90; H04L 47/56; H04L 2012/5681
See application file for complete search history.

(56) References Cited

U.S. PATENT DOCUMENTS

| | | | | |
|---|---|---|---|---|
| 7,908,358 | B1 * | 3/2011 | Prasad | G06F 11/3495 709/224 |
| 2021/0105513 | A1 * | 4/2021 | Nihei | G06F 13/00 |
| 2024/0314636 | A1 * | 9/2024 | Liu | H04L 47/2416 |
| 2025/0126075 | A1 * | 4/2025 | Kerschbaum | H04L 47/6215 |

OTHER PUBLICATIONS

Gammo, Louay et al., "Comparing and Evaluating epoll, select, and poll Event Mechanisms," Linux Symposium, vol. 1, 2004, 14 pages.
Herbert, Tom et al., "Scaling in the Linux Networking Stack," Retrieved from Internet: https://www.kernel.org/doc/html/latest/networking/scaling.html, 2024, 10 pages.
Majkowski, Marek, "Everything you ever wanted to know about UDP sockets but were afraid to ask, part 1," Retrieved from Internet: https://blog.cloudflare.com/everything-you-ever-wanted-to-know-about-udp-sockets-but-were-afraid-to-ask-part-1/, Nov. 25, 2021, 11 pages.
Majkowski, Marek, "How to achieve low latency with 10Gbps Ethernet," Retrieved from Internet: https://blog.cloudflare.com/how-to-achieve-low-latency/, Jun. 30, 2015, 19 pages.
Shaw, Zed A., "Shedding Bikes," Retrieved from Internet: https://web.archive.org/web/20101129120747/http://sheddingbikes.com/posts/1280829388.html, 6 pages, 2010.

* cited by examiner

NETWORK STACK FOR TRANSMISSION OF APPLICATION DATA OVER NETWORK CONNECTIONS

TECHNICAL FIELD

Implementations relate generally to transmission of data over networks, and specifically to a network stack for the transmission of application data over a network connection.

BACKGROUND

Some online virtual experience platforms allow users to connect with each other, interact with each other (e.g., within a virtual experience), create virtual experiences, and share information with each other via the Internet. Users of online virtual experience platforms may participate in multiplayer environments (e.g., in virtual three-dimensional environments), design custom environments, design characters and avatars, design, simulate, or create animation routines that are utilized within the environments, decorate avatars, exchange virtual items/objects with other users, and so forth. Users may utilize audio, video, and other digital content to enhance the virtual experience.

Virtual platforms can utilize a server-client architecture to implement virtual experiences in order to facilitate a large number of users who may be geographically dispersed to participate in a virtual experience that can be accessed from their individual computing (client) devices. The virtual experience may be implemented such that virtual objects and environments are streamed to individual client devices from a server device and/or from client devices to the server device. Additionally, multiple types of data, such as voice, text data, game data, etc., may be transmitted between the server and respective client devices.

The background description provided herein is for the purpose of presenting the context of the disclosure. Work of the presently named inventors, to the extent it is described in this background section, as well as aspects of the description that may not otherwise qualify as prior art at the time of filing, are neither expressly nor impliedly admitted as prior art against the prior disclosure.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method to transmit application data over a network connection. The computer-implemented method also includes receiving application data from each application of a plurality of applications, where the application data may include a plurality of datagrams; determining a permitted data rate for each application of the plurality of applications; shaping the application data received from each application of the plurality of applications based on the permitted data rate for the application into respective shaped application data; adding the shaped application data associated with each application to a queue; assigning the datagrams included in the queue to a particular data stream of a plurality of data streams based on metadata associated with each datagram; applying stream level flow control to each data stream of the plurality of data streams to identify a subset of datagrams from the each data stream in the queue; generating a packet for transmission over the connection, where the packet includes the subset of datagrams from at least two data streams of the plurality of data streams; and transmitting the packet over the network connection. Other embodiments of this aspect include corresponding computer systems, apparatus, and computer programs recorded on one or more computer storage devices, each configured to perform the actions of the methods.

Implementations may include the computer-implemented method where determining the permitted data rate for each application of the plurality of applications may include determining the permitted data rate based on a connection bit rate of the network connection and a predetermined allocation ratio that apportions available bandwidth of the network connection between the plurality of applications. Assigning datagrams included in the queue to the corresponding data stream of the plurality of data streams based on metadata associated with each datagram may include classifying the datagrams in the queue based on one or more of a reliability indicator and a priority indicator associated with the datagrams. Each datagram of the plurality of datagrams has a stream identifier associated with a traffic class. The computer-implemented method may include, prior to applying the stream level flow control to each data stream of the plurality of data streams, applying connection level flow control to the network connection to determine a connection level data rate for the network connection. The plurality of applications includes at least a first application and a second application, and where application data received from the first application includes a first set of datagrams with a first level of latency tolerance and where application data received from the second application includes a second set of datagrams with a second level of latency tolerance. Applying the stream level flow control to each data stream of the plurality of data streams may include skipping one or more blocked data streams such that no datagrams from the blocked data streams are included in the subset of datagrams. Shaping the application data received from each application may include adding a metered quantity of the received application data that corresponds to the permitted data rate to the queue. Adding the shaped application data associated with each application to a queue may include adding the shaped application data associated with each application to a blended queue that includes datagrams received from at least one other application of the plurality of applications. Implementations of the described techniques may include hardware, a method or process, or computer software on a computer-accessible medium.

One general aspect includes a non-transitory computer-readable medium with instructions stored thereon, that responsive to execution by a processing device, cause the processing device to perform operations that include receiving application data from each application of a plurality of applications, where the application data may include a plurality of datagrams; determining a permitted data rate for each application of the plurality of applications; shaping the application data received from each application of the plurality of applications based on the permitted data rate for the application into respective shaped application data; adding the shaped application data associated with each application to a queue; assigning the datagrams included in the queue to a particular data stream of a plurality of data streams based on metadata associated with each datagram; applying stream level flow control to each data stream of the plurality of data streams to identity a subset of datagrams from the each data stream in the queue; generating a packet for transmission over a network connection, where the packet includes the subset of datagrams from at least two data streams of the plurality of data streams; and transmitting the packet over the network connection. Other embodiments of this aspect include corresponding computer systems, apparatus, and computer programs recorded on one or more computer storage devices, each configured to perform the actions of the methods.

Implementations may include the non-transitory computer-readable medium where determining the permitted data rate for each application of the plurality of applications may include determining the permitted data rate based on a connection bit rate of the network connection and a predetermined allocation ratio that apportions available bandwidth of the network connection between the plurality of applications. Assigning datagrams included in the queue to the corresponding data stream of the plurality of data streams based on metadata associated with each datagram may include classifying the datagrams in the queue based on one or more of a reliability indicator and a priority indicator associated with the datagrams. The operations further may include, prior to applying the stream level flow control to each data stream of the plurality of data streams, applying connection level flow control to the network connection to determine a connection level data rate for the network connection. Adding the shaped application data associated with each application to a queue may include adding the shaped application data associated with each application to a blended queue that includes datagrams received from at least one other application of the plurality of applications. Implementations of the described techniques may include hardware, a method or process, or computer software on a computer-accessible medium.

One general aspect includes a system that includes a memory with instructions stored thereon and a processing device, coupled to the memory, the processing device configured to access the memory and execute the instructions, where the instructions cause the processing device to perform operations that may include receiving application data from each application of a plurality of applications, where the application data may include a plurality of datagrams; determining a permitted data rate for each application of the plurality of applications; shaping the application data received from each application of the plurality of applications based on the permitted data rate for the application into respective shaped application data; adding the shaped application data associated with each application to a queue; assigning the datagrams included in the queue to a particular data stream of a plurality of data streams based on metadata associated with each datagram; applying stream level flow control to each data stream of the plurality of data streams to identity a subset of datagrams from the each data stream in the queue; generating a packet for transmission over a network connection, where the packet includes the subset of datagrams from at least two data streams of the plurality of data streams; and transmitting the packet over the network connection. Other embodiments of this aspect include corresponding computer systems, apparatus, and computer programs recorded on one or more computer storage devices, each configured to perform the actions of the methods.

Implementations may include the system where determining the permitted data rate for each application of the plurality of applications may include determining the permitted data rate based on a connection bit rate of the network connection and a predetermined allocation ratio that apportions available bandwidth of the network connection between the plurality of applications. The operations further may include, prior to applying the stream level flow control to each data stream of the plurality of data streams, applying connection level flow control to the network connection to determine a connection level data rate for the network connection. Adding the shaped application data associated with each application to a queue may include adding the shaped application data associated with each application to a blended queue that includes datagrams received from the plurality of applications. The plurality of applications includes at least a first application and a second application, and where application data received from the first application includes a first set of datagrams with a first level of latency tolerance and where application data received from the second application includes a second set of datagrams with a second level of latency tolerance. Applying the stream level flow control to each data stream of the plurality of data streams may include skipping one or more blocked data streams such that no datagrams from the blocked data streams are included in the subset of datagrams. Implementations of the described techniques may include hardware, a method or process, or computer software on a computer-accessible medium.

DETAILED DESCRIPTION

Figure 1:
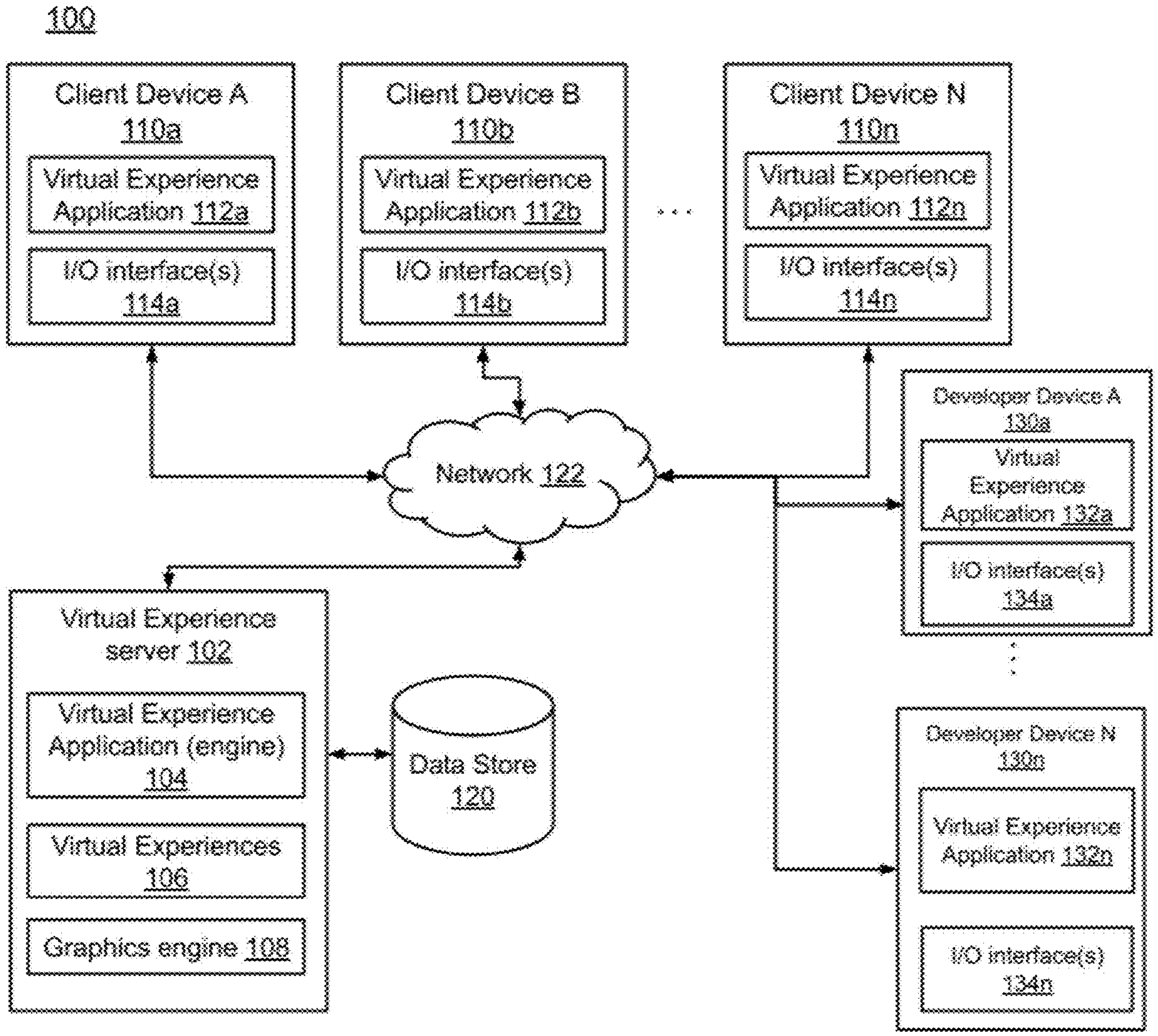
FIG. 1 is a diagram of an example system architecture to transmit application data over a network connection, in accordance with some implementations.

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented herein. Aspects of the present disclosure, as generally described herein, and illustrated in the Figures, can be arranged, substituted, combined, separated, and designed in a wide variety of different configurations, all of which are contemplated herein.

References in the specification to "some implementations", "an implementation", "an example implementation", etc. indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, such feature, structure, or characteristic may be effected in connection with other implementations whether or not explicitly described.

Virtual experience platforms (also referred to as "user-generated content platforms" or "user-generated content systems") offer a variety of ways for users to interact with one another. For example, users of a virtual experience platform may work together towards a common goal, share various virtual objects, send electronic messages to one another, and so forth. Users of a virtual experience platform may join virtual experiences as virtual characters, playing specific roles. For example, a virtual character may be part of a team or multiplayer environment wherein each character is assigned a role and has associated parameters, e.g., clothing, armor, weaponry, skills, etc. that correspond to the role.

In order to provide a superior user experience, the virtual experience platform may enable in-experience content streaming. In-experience content streaming may enable the virtual experience platform, e.g., by utilizing a virtual experience engine to dynamically load and unload three dimensional (3D) and other audio, text, or video content on specific client devices.

While participating in the virtual experience, users may communicate with other users (players) via text messages, voice chat, video chat, etc. In some virtual experiences, a set of users may participate in a shared experience, e.g., a virtual concert or movie that is simultaneously streamed to all users. The virtual experience platform may enable simultaneous streaming of multiple types of content, from one or multiple sources. For example, a client device may receive content that includes text chat data, voice chat data, video data, etc.

Participants (users) in a virtual experience can utilize a variety of devices to participate in the virtual experience; the devices commonly have different capabilities in terms of device memory capacity, device processing speed, device screen size, etc., and may be connected to the virtual experience server over different types of networks. Example networks may include public networks (e.g., the Internet), private networks (e.g., a local area network (LAN) or wide area network (WAN)), wired networks (e.g., Ethernet network), wireless networks (e.g., an 802.11 network, a Wi-Fi® network, or wireless LAN (WLAN)), cellular networks (e.g., a 5G network, a Long Term Evolution (LTE) network, etc.), satellite networks, routers, hubs, switches, server computers, or a combination thereof.

Streaming content is provided to client devices over a network, and virtual objects in a virtual experience may be synchronized over the network in a pull mode or a push mode. In a push mode synchronization, a server device may push (transmit) a set of virtual objects that is to be rendered on a particular client device to the particular client device. In a pull mode synchronization, a client device may obtain a set of virtual objects that are to be rendered and their respective states by polling, e.g., via an application program interface (API), a server. For example, the server may include a database that stores virtual objects and their respective states.

A virtual experience engine that is utilized to support a virtual experience can generate multiple types of application data, including voice, video, text, binary (e.g., compiled code, intermediate code representation), etc. Applications that generate and utilize the application data commonly coexist within the same executable program. The various types of application data can often utilize different protocols, encoding schemes, congestion control schemes, etc., that are utilized to configure and/or govern their transmission over the network.

Transmission of data over a network is based on a specified network stack (protocol stack). The network stack is utilized to define the communication protocols between devices within a network and is built as a set of layers where each layer of the network stack is utilized to configure communications between any particular layer and its corresponding higher and lower layers.

Layered modularization enables simplified evaluation and/or testing. The lowest layer deals with interaction of the network stack with the communications hardware e.g., network sockets etc., while the higher layers are connected to the applications that generate application data.

A technical problem in network communications is the design of a network stack that can handle multiple types of application data, particularly when application data may be generated by multiple threads/processes within a single executable software application. Additionally, the network stack is compatible with both server computing devices and client devices.

Depending on the type of computing device where the network stack is deployed, e.g., whether a server device or client device, design and implementation of the network stack faces a scaling problem on different axes. When implemented on a server side device, the network stack is required to support a larger number of network connections, e.g., thousands of network connections. When implemented on a client side device, the network stack is required to be flexible and modular to support multiple types of client devices and communication protocols.

The applications typically run in resource-scarce environments that do not have an abundance of memory, CPU, and bandwidth. While the allocation of resources, e.g., allocation of bandwidth to specific applications may be performed based on assumed network conditions, the bandwidth quotas have to be enforced under dynamically changing conditions. Since a total available bandwidth over the network connection can change as network conditions change, the network stack is required to include the capability to allocate the dynamically changing bandwidth across multiple applications as per their respective bandwidth quota (allocations).

Achieving performance and scalability for a user-space multi-protocol stack that allows bandwidth management along with flexibility to run in diverse environments like client and server poses several technical challenges.

This disclosure describes a network stack that is performant, scalable, and in addition to providing support for multiple protocols, e.g., different protocols for different types of application data, can be utilized to enforce bandwidth quotas over multiple protocols. The enforcement of bandwidth quotas can be performed even without the network stack having explicit visibility into each specific protocol being utilized.

As an example, a virtual experience platform may include support for the streaming of text data, voice (e.g., speech)

data, audio (e.g., streaming music) data, video data, and game data. Each of the types of data may be associated with a corresponding encoding scheme and a corresponding transmission protocol.

An encoding scheme for data is utilized to convert application data into a specialized format for efficient transmission and/or storage. The application data is encoded at a transmitted device, transmitted in an encoded manner to a receiving device, where it is decoded back to the original format. For example, within a single virtual experience platform, text data may be encoded based on an ASCII character encoding scheme, speech data encoded based on a linear predictive coding (LPC) or modified discrete cosine transform (MDCT) coding, audio data encoded based on a MP3 code or free lossless audio codec (FLAC), and video data encoded using an MP4 codec or AVI codec.

The encoded application data is transmitted over a network based on a network protocol, which is a set of rules that define how application data is transmitted from one device or system to another across the network. For example, a protocol for video transmission may be utilized to standardize the segmenting of a video stream into smaller chunks that are more easily transmitted.

To provide the virtual experience, application data from the different applications is transmitted to different devices, e.g., client devices participating in the virtual experience. Application data can be generated at a centralized server device as well as at one or more client devices that participate in the virtual experience. In some scenarios, a virtual experience server may receive application data from different devices, combine the application data, and transmit data to participating client devices. Analogously (similarly), a client device may receive application data from different servers (server devices).

In some implementations, changes to state(s) of virtual objects that occur within the virtual environment are transmitted to client devices by the virtual experience engine. For example, in a scenario where a script written by a developer (of the virtual experience) triggers a change to the size of a car wheel of a car (that is present in the virtual experience) on a server device, the server device may push the update of the size of the wheel to one or more client devices that have the car streamed in from the server.

Similarly, in a scenario where on a client device that is an authoritative owner of a car in the virtual experience and the velocity of the car undergoes a change, an updated position about the car may be transmitted from the client device to the server device, and subsequently, from the server device to one or more other client devices that participate in the virtual experience.

In some implementations, a set of virtual objects to be rendered locally on the client device are stored in a workspace (memory) of the client device, which serves as a repository to hold virtual objects that exist in the virtual experience (e.g., a 3D world). The contents of the workspace (memory) are updated, e.g., as virtual objects move around within the virtual experience, as virtual objects get destroyed within the virtual experience, as new virtual objects get added to the virtual experience, etc. At suitable times, e.g., corresponding to a refresh rate, a display screen of the local device may be updated based on an updated state of the virtual objects in the workspace (memory) of the client device.

Streaming and local rendering of virtual objects may not be limited to display of virtual objects. For example, in some implementations, rendering of virtual objects may include playback of a sound (e.g., where a virtual object corresponds to a sound file), application of a texture on a virtual object (e.g., where a virtual object corresponds to an image), execution of a script locally on the client device (e.g., where a virtual object is based on the script), etc. In some implementations, the streaming and local rendering of application data can include the display and/or other presentation of text chat data, voice data, streaming video data etc.

In addition to the application data from different applications being associated with different encodings and protocols, the application data may also be associated with different levels of tolerance for latency, timeliness, reliability, etc. For example, timeliness of application data may be based on particular specified deadlines associated with the data coming in from an application. In some scenarios, application data that is not transmitted to a receiver device by a particular deadline is discarded. Similarly, if the application data is not received at a receiver device within a specified deadline, the application data may be discarded and not processed.

Classification of datagrams into respective priority/reliability classes may be based on metadata associated with the datagrams. In order to organize and facilitate transmission of application data (traffic) of different types, distinct data stream identifiers are utilized by the network stack to track the application data. The application data are characterized by their priority level, reliability, and ordering guarantees. An identifier is requested, e.g., originating at an application, from the network stack. Suitable levels of tolerance for latency, timeliness, and reliability are indicated based on levels suited to their use case. For example, time-sensitive traffic may benefit from being transmitted with an identifier registered with the network stack to be unreliable with high priority. At the network stack, the identifier is associated with the provided characteristics. An ordering rule may be utilized to guarantee that datagrams associated with the identifier are sent with the corresponding reliability and priority and received by the remote application.

In some implementations, when a datagram is transmitted by an application, an identifier (metadata), e.g., a stream identifier, that has been previously obtained from the network stack is included in the transmission. The identifier includes information that can be utilized to specify one or more parameters for the datagram, e.g., priority, reliability, ordering, etc.

In some implementations, prior to application of any metering, shaping, or prioritization operations, a sequence number is assigned to the datagram by the network stack. The combination of the sequence number and the identifier uniquely identifies each datagram. The assigned sequence numbers are monotonically increasing, meaning that for any two datagrams with the same identifier, the one with the lesser sequence number was transmitted first from an application to the network stack.

Priority associated with a datagram may be utilized by the network stack to provide a suitable quality of service to the datagram, e.g., by applying suitable algorithms to the traffic. A priority value associated with the datagram can be utilized as an input to application of queuing techniques, e.g., first in-first-out (FIFO), strict prioritization, weighted fair queueing (WFQ), etc.

In some implementations, a reliability level included in the identifier may be a binary value and indicative of whether a datagram from the application is reliable or unreliable. For example, the reliability level may be represented by a numeral, e.g., 0 or 1. The reliability level value may be utilized to inform various implementation details of an identifier, such as for datagram reconstruction and retransmission.

In some implementations, an ordering value included in an identifier describes the arrangement in which received datagrams are offered to the application. With strict ordering, datagrams are offered to the receiving application according to the order in which they were transmitted by the originating (sending) application. With loose ordering, datagrams are offered in the order they were received by the network stack of the receiver device. Loose ordering may differ from strict ordering in cases where datagrams are re-ordered by one or more intermediary networks between the sender and receiver, or if a datagram is dropped by a network and must be retransmitted.

Identifiers may also be configured based on properties that can be utilized to track and facilitate health of a network connection with respect to the relationship between the communicating applications. For example, a flow control value included in an identifier may be utilized to describe a volume (amount) of traffic, typically measured in bytes, that will be accepted by the receiver. In some implementations, receive-side queueing and application processing may be implemented at the network stack as input to flow control of an identifier, thereby only restoring credit to the sender as traffic is consumed at the receiving application. An application under heavy load may choose not to restore flow credit to the sender as a form of recovery. The health of the identifier is maintained at the network stack. Communication between the network stack and the transmitting application may be utilized to make similarly informed decisions.

For example, when a player joins a virtual experience such as a game, virtual objects and game application data associated with the game have to be transmitted to the device of the player that just joined. For example, the game application data can include virtual object data model details, e.g., structure, location, size, meshes, etc., of virtual objects that are currently part of the virtual experience. The game application data can also include details of the terrain as well as details of other users (participants) in the virtual experience/game. For a high quality user experience, it is important that game application data such as game models (e.g., a comprehensive list of all virtual objects associated with a virtual experience such as a game) are reliably transmitted to each participating client device. Additionally, an order in which application data such as virtual object data model updates are delivered may not be important, as long as they are ultimately received at the client device.

On the other hand, other application data such as physics solver data, e.g., updates to the position, orientation, velocity, etc. of virtual objects may need to be transmitted in a timely manner for them to be effectively utilized by a receiving device to render the virtual experience. For example, if a physics solver update for a particular time step is delayed to an extent that it arrives at a receiving device after the client device has received an update for a subsequent time step, the update for the earlier time step is redundant and not usable. Similarly, in the case of application data that includes voice data, timely delivery of the voice data may be important, but packet loss may be tolerable since an occasional drop of voice data may not negatively affect the user experience significantly.

However, different physics solver data may include different types of event data that may be associated with different priorities. For example, in a virtual experience that is a soccer game, application data that includes a ball hitting a goalpost may be denoted as data that is to be reliably delivered, even if delayed. In some implementations, developer users (virtual experience designers) can specify a level of tolerance for delay, timeliness, etc., for virtual objects and/or virtual events within a virtual experience that are to be transmitted to participating users.

A virtual experience platform can include multiple server devices located across multiple data centers that can serve multiple, e.g., millions of client devices. The respective devices may be connected via multiple types of networks. The networks may have different network speeds that all can have dynamically changing network conditions (e.g. jitter, packet loss), speeds, conditions of congestion, etc.

The techniques related to a network stack as described herein can support multiple protocols under one system layer that scales (at most) linearly with the number of network connections. This enables the same network stack to be used for numerous virtual experience engine applications, e.g., engine-data, voice, and video over various networks and environments, e.g., client-server over the public internet, server-server over a private network, etc.

In some implementations, the network stack is realized by three layers of functionality—namely, a system layer, a protocol layer, and a platform layer. Implementation details of functions in each layer are abstracted such that the functions can be adjusted (changed) without affecting functions in other layers. In some implementations, the system layer is agnostic to both the application that generates application data and the underlying network protocols. This enables the network stack (NetStack) to be utilized for all networking needs across the virtual experience platform.

Features of the network stack include:

- Support for protocols that use connection-oriented sockets and connectionless sockets
- Support for protocols that are based on internet protocol (IP) and those that are based on inter-process communication (IPC)
- Support for protocols that may make use of multiple sockets for a single logical connection
- Support for applications that need long-lived (e.g., data model replication, voice) connections and short-lived (e.g. http) connections
- Support for applications that need reliable data, unreliable data, and a mix of both.
- Support for simultaneous connections to multiple devices The network stack described herein utilizes resources, e.g., CPU and memory, in a manner that grows at most linearly with the number of connections, and hence is scalable as the number of connections increases. The network stack enables the processing of packets in one network connection independently of all other network connections. The network stack additionally provides support for data with different levels of tolerance for various attributes of transmission of the data, e.g., latency, packet loss, reliability, etc.

The unified network stack is agnostic to underlying network protocols for the different applications implemented on a virtual experience platform and offers efficient transmission of data from different applications across network connections.

FIG. 1 is a diagram of an example system architecture to transmit application data over a network connection, in accordance with some implementations. FIG. 1 and the other figures use similar reference numerals to identify similar elements. A letter after a reference numeral, such as "110," indicates that the text refers specifically to the element having that particular reference numeral. A reference numeral in the text without a following letter, such as "110,"

refers to any or all of the elements in the figures bearing that reference numeral (e.g. "110" in the text refers to reference numerals "110*a*," "110*b*," and/or "110*n*" in the figures).

The system architecture 100 (also referred to as "system" herein) includes virtual experience server 102, data store 120, client devices 110*a*, 110*b*, and 110*n* (generally referred to as "client device(s) 110" herein), and developer devices 130*a* and 130*n* (generally referred to as "developer device(s) 130" herein). Virtual experience server 102, data store 120, client devices 110, and developer devices 130 are coupled via network 122. In some implementations, client devices(s) 110 and developer device(s) 130 may refer to the same or same type of device.

Virtual experience server 102 can include, among other things, a virtual experience application (engine) 104, and one or more virtual experiences 106. In some implementations, the virtual experience application 104 may perform one or more of the operations described below in connection with the methods illustrated in FIGS. 4, 5A, and 5B. A client device 110 can include a virtual experience application 112, and input/output (I/O) interfaces 114 (e.g., input/output devices). The input/output devices can include one or more of a microphone, speakers, headphones, display device, mouse, keyboard, virtual experience controller, touchscreen, virtual reality consoles, etc.

A developer device 130 can include a virtual experience application 132, and input/output (I/O) interfaces 134 (e.g., input/output devices). The input/output devices can include one or more of a microphone, speakers, headphones, display device, mouse, keyboard, virtual experience controller, touchscreen, virtual reality consoles, etc.

System architecture 100 is provided for illustration. In different implementations, the system architecture 100 may include the same, fewer, more, or different elements configured in the same or different manner as that shown in FIG. 1.

In some implementations, network 122 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a 5G network, a Long Term Evolution (LTE) network, etc.), routers, hubs, switches, server computers, or a combination thereof.

In some implementations, the data store 120 may be a non-transitory computer readable memory (e.g., random access memory), a cache, a drive (e.g., a hard drive), a flash drive, a database system, or another type of component or device capable of storing data. The data store 120 may also include multiple storage components (e.g., multiple drives or multiple databases) that may also span multiple computing devices (e.g., multiple server computers). In some implementations, data store 120 may include cloud-based storage.

In some implementations, the virtual experience server 102 can include a server having one or more computing devices (e.g., a cloud computing system, a rackmount server, a server computer, cluster of physical servers, etc.). In some implementations, the virtual experience server 102 may be an independent system, may include multiple servers, or be part of another system or server.

In some implementations, the virtual experience server 102 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the virtual experience server 102 and to provide a user with access to virtual experience server 102. The virtual experience server 102 may also include a website (e.g., a web page) or application back-end software that may be used to provide a user with access to content provided by virtual experience server 102. For example, users may access virtual experience server 102 using the virtual experience application 112 on client devices 110.

In some implementations, virtual experience session data are generated via virtual experience server 102, virtual experience application 112, and/or virtual experience application 132, and are stored in data store 120. With permission from virtual experience players, virtual experience session data may include associated metadata, e.g., virtual experience identifier(s); device data associated with the players; demographic information of the player(s); virtual experience play session identifier(s); chat transcripts; session start time, session end time, and session duration for each player; relative locations of participant avatar(s) within a virtual experience environment; in-virtual experience purchase(s) by one or more player(s); accessories utilized by virtual experience players; etc.

In some implementations, virtual experience server 102 may be a type of social network providing connections between users or a type of user-generated content system that allows users (e.g., end-users or consumers) to communicate with other users on the virtual experience server 102, where the communication may include voice chat (e.g., synchronous and/or asynchronous voice communication), video chat (e.g., synchronous and/or asynchronous video communication), or text chat (e.g., 1:1 and/or N:N synchronous and/or asynchronous text-based communication). A record of some or all user communications may be stored in data store 120 or within virtual experiences 106. The data store 120 may be utilized to store chat transcripts (text, audio, images, etc.) exchanged between players.

In some implementations, the chat transcripts are generated via virtual experience application 112 and/or virtual experience application 132 or and are stored in data store 120. The chat transcripts may include the chat content and associated metadata, e.g., text content of chat with each message having a corresponding sender and recipient(s); message formatting (e.g., bold, italics, loud, etc.); message timestamps; relative locations of participant avatar(s) within a virtual experience environment, accessories utilized by virtual experience participants, etc. In some implementations, the chat transcripts may include multilingual content, and messages in different languages from different virtual experience sessions of a virtual experience may be stored in data store 120.

In some implementations, chat transcripts may be stored in the form of conversations between participants based on the timestamps. In some implementations, the chat transcripts may be stored based on the originator of the message(s).

In some implementations of the disclosure, a "user" may be represented as a single individual. However, other implementations of the disclosure encompass a "user" (e.g., creating user) being an entity controlled by a set of users or an automated source. For example, a set of individual users federated as a community or group in a user-generated content system may be considered a "user."

In some implementations, virtual experience server 102 may be a virtual gaming server. For example, the gaming server may provide single-player or multiplayer virtual experiences to a community of users that may access or interact with virtual experiences using client devices 110 via network 122. In some implementations, virtual experiences (also referred to as "video virtual experience," "online virtual experience," or "virtual experience" herein) may be two-dimensional (2D) virtual experiences, three-dimensional (3D) virtual experiences (e.g., 3D user-generated virtual experiences), virtual reality (VR) virtual experiences, or augmented reality (AR) virtual experiences, for example. In some implementations, users may participate in virtual experiences with other users. In some implementations, a virtual experience may be played in real-time with other users of the virtual experience.

In some implementations, virtual experiences may refer to the interaction of one or more players using client devices (e.g., 110) within a virtual experience (e.g., 106) or the presentation of the interaction on a display or other output device (e.g., 114) of a client device 110.

In some implementations, a virtual experience 106 can include an electronic file that can be executed or loaded using software, firmware or hardware configured to present the virtual experience content (e.g., digital media item) to an entity. In some implementations, a virtual experience application 112 may be executed and a virtual experience 106 rendered in connection with a virtual experience engine 104. In some implementations, a virtual experience 106 may have a common set of rules or common goal, and the environment of a virtual experience 106 shares the common set of rules or common goal. In some implementations, different virtual experiences may have different rules or goals from one another.

In some implementations, virtual experiences may have one or more environments (also referred to as "gaming environments" or "virtual environments" herein) where multiple environments may be linked. An example of an environment may be a three-dimensional (3D) environment. The one or more environments of a virtual experience 106 may be collectively referred to as a "world" or "gaming world" or "virtual world" or "universe" herein. An example of a world may be a 3D world of a virtual experience 106. For example, a user may build a virtual environment that is linked to another virtual environment created by another user. A character of the virtual experience may cross the virtual border to enter the adjacent virtual environment.

Three-dimensional (3D) environments or 3D worlds use graphics that use a three-dimensional representation of geometric data representative of virtual experience content (or at least present virtual experience content to appear as 3D content whether or not 3D representation of geometric data is used). 2D environments or 2D worlds use graphics that use two-dimensional representation of geometric data representative of virtual experience content.

In some implementations, the virtual experience server 102 can host one or more virtual experiences 106 and can permit users to interact with the virtual experiences 106 using a virtual experience application 112 of client devices 110. Users of the virtual experience server 102 may play, create, interact with, or build virtual experiences 106, communicate with other users, and/or create and build objects (e.g., also referred to as "item(s)" or "virtual experience objects" or "virtual experience item(s)" herein) of virtual experiences 106.

For example, in generating user-generated virtual items, users may create characters, decoration for the characters, one or more virtual environments for an interactive virtual experience, or build structures used in a virtual experience 106, among others. In some implementations, users may buy, sell, or trade virtual experience objects, such as in-platform currency (e.g., virtual currency), with other users of the virtual experience server 102. In some implementations, virtual experience server 102 may transmit virtual experience content to virtual experience applications (e.g., 112). In some implementations, virtual experience content (also referred to as "content" herein) may refer to any data or software instructions (e.g., virtual experience objects, virtual experience, user information, video, images, commands, media item, etc.) associated with virtual experience server 102 or virtual experience applications. In some implementations, virtual experience objects (e.g., also referred to as "item(s)" or "objects" or "virtual objects" or "virtual experience item(s)" herein) may refer to objects that are used, created, shared or otherwise depicted in virtual experience applications 106 of the virtual experience server 102 or virtual experience applications 112 of the client devices 110. For example, virtual experience objects may include a part, model, character, accessories, tools, weapons, clothing, buildings, vehicles, currency, flora, fauna, components of the aforementioned (e.g., windows of a building), and so forth.

It may be noted that the virtual experience server 102 hosting virtual experiences 106, is provided for purposes of illustration. In some implementations, virtual experience server 102 may host one or more media items that can include communication messages from one user to one or more other users. With user permission and express user consent, the virtual experience server 102 may analyze chat transcripts data to improve the virtual experience platform. Media items can include, but are not limited to, digital video, digital movies, digital photos, digital music, audio content, melodies, website content, social media updates, electronic books, electronic magazines, digital newspapers, digital audio books, electronic journals, web blogs, real simple syndication (RSS) feeds, electronic comic books, software applications, etc. In some implementations, a media item may be an electronic file that can be executed or loaded using software, firmware or hardware configured to present the digital media item to an entity.

In some implementations, a virtual experience 106 may be associated with a particular user or a particular group of users (e.g., a private virtual experience), or made widely available to users with access to the virtual experience server 102 (e.g., a public virtual experience). In some implementations, where virtual experience server 102 associates one or more virtual experiences 106 with a specific user or group of users, virtual experience server 102 may associate the specific user(s) with a virtual experience 106 using user account information (e.g., a user account identifier such as username and password).

In some implementations, virtual experience server 102 or client devices 110 may include a virtual experience engine 104 or virtual experience application 112. In some implementations, virtual experience engine 104 may be used for the development or execution of virtual experiences 106. For example, virtual experience engine 104 may include a rendering engine ("renderer") for 2D, 3D, VR, or AR graphics, a physics engine, a collision detection engine (and collision response), sound engine, scripting functionality, animation engine, artificial intelligence engine, networking functionality, streaming functionality, memory management functionality, threading functionality, scene graph functionality, or video support for cinematics, among other features. The components of the virtual experience engine 104 may generate commands that help compute and render the virtual experience (e.g., rendering commands, collision commands, physics commands, etc.) In some implementations, virtual experience applications 112 of client devices 110, respectively, may work independently, in collaboration with virtual experience engine 104 of virtual experience server 102, or a combination of both.

In some implementations, both the virtual experience server 102 and client devices 110 may execute a virtual experience engine (104 and 112, respectively). The virtual experience server 102 using virtual experience engine 104 may perform some or all the virtual experience engine functions (e.g., generate physics commands, rendering commands, etc.), or offload some or all the virtual experience engine functions to virtual experience engine 112 of client device 110. In some implementations, each virtual experience 106 may have a different ratio between the virtual experience engine functions that are performed on the virtual experience server 102 and the virtual experience engine functions that are performed on the client devices 110. For example, the virtual experience engine 104 of the virtual experience server 102 may be used to generate physics commands in cases where there is a collision between at least two virtual experience objects, while the additional virtual experience engine functionality (e.g., generate rendering commands) may be offloaded to the client device 110. In some implementations, the ratio of virtual experience engine functions performed on the virtual experience server 102 and client device 110 may be changed (e.g., dynamically) based on virtual experience conditions. For example, if the number of users participating in virtual experiences of a particular virtual experience 106 exceeds a threshold number, the virtual experience server 102 may perform one or more virtual experience engine functions that were previously performed by the client devices 110.

For example, users may be playing a virtual experience 106 on client devices 110, and may send control instructions (e.g., user inputs, such as right, left, up, down, user election, or character position and velocity information, etc.) to the virtual experience server 102. Subsequent to receiving control instructions from the client devices 110, the virtual experience server 102 may send virtual experience instructions (e.g., position and velocity information of the characters participating in the group virtual experience or commands, such as rendering commands, collision commands, etc.) to the client devices 110 based on control instructions. For instance, the virtual experience server 102 may perform one or more logical operations (e.g., using virtual experience engine 104) on the control instructions to generate virtual experience instruction(s) for the client devices 110. In other instances, virtual experience server 102 may pass one or more or the control instructions from one client device 110 to other client devices (e.g., from client device 110*a* to client device 110*b*) participating in the virtual experience 106. The client devices 110 may use the virtual experience instructions and render the virtual experience for presentation on the displays of client devices 110.

In some implementations, the control instructions may refer to instructions that are indicative of in-virtual experience actions of a user's character. For example, control instructions may include user input to control the in-virtual experience action, such as right, left, up, down, user selection, gyroscope position and orientation data, force sensor data, etc. The control instructions may include character position and velocity information. In some implementations, the control instructions are sent directly to the virtual experience server 102. In other implementations, the control instructions may be sent from a client device 110 to a second client device (e.g., from client device 110*b* to client device 110*n*), where the client device generates virtual experience instructions using the local virtual experience engine 112. Client to client communications may be enabled by an implementation of the network stack on one client device in client mode and on a second client device in server mode. The control instructions may include instructions to play a voice communication message or other sounds from another user on an audio device (e.g., speakers, headphones, etc.).

In some implementations, virtual experience instructions may refer to instructions that enable a client device 110 to render scenes from a virtual experience, such as a multiplayer virtual experience. The virtual experience instructions may include one or more of user input (e.g., control instructions), character position and velocity information, or commands (e.g., physics commands, rendering commands, collision commands, etc.).

In some implementations, characters (or virtual experience objects generally) are constructed from components, one or more of which may be selected by the user, that automatically join together to aid the user in editing.

In some implementations, a character is implemented as a 3D model and includes a surface representation used to draw the character (also known as a skin or mesh) and a hierarchical set of interconnected bones (also known as a skeleton or rig). The rig may be utilized to animate the character and to simulate motion and action by the character. The 3D model may be represented as a data structure, and one or more parameters of the data structure may be modified to change various properties of the character, e.g., dimensions (height, width, girth, etc.); body type; movement style; number/type of body parts; proportion (e.g. shoulder and hip ratio); head size; etc.

One or more characters (also referred to as an "avatar" or "model" herein) may be associated with a user where the user may control the character to facilitate a user's interaction with the virtual experience 106.

In some implementations, a character may include components such as body parts (e.g., hair, arms, legs, etc.) and accessories (e.g., t-shirt, glasses, decorative images, tools, etc.). In some implementations, body parts of characters that are customizable include head type, body part types (arms, legs, torso, and hands), face types, hair types, and skin types, among others. In some implementations, the accessories that are customizable include clothing (e.g., shirts, pants, hats, shoes, glasses, etc.), weapons, or other tools.

In some implementations, for some asset types, e.g. shirts, pants, etc. the online gaming platform may provide users access to simplified 3D virtual object models that are represented by a mesh of a low polygon count, e.g. between about 20 and about 30 polygons.

In some implementations, the user may also control the scale (e.g., height, width, or depth) of a character or the scale of components of a character. In some implementations, the user may control the proportions of a character (e.g., blocky, anatomical, etc.). It may be noted that in some implementations, a character may not include a character virtual experience object (e.g., body parts, etc.) but the user may control the character (without the character virtual experience object) to facilitate the user's interaction with the virtual experience (e.g., a puzzle virtual experience where there is no rendered character virtual experience object, but the user still controls a character to control in-virtual experience action).

In some implementations, a component, such as a body part, may be a primitive geometrical shape such as a block, a cylinder, a sphere, etc., or other primitive shape such as a wedge, a torus, a tube, a channel, etc. In some implementations, a creator module may publish a user's character for view or use by other users of the virtual experience server 102. In some implementations, creating, modifying, or customizing characters, other virtual experience objects, virtual experiences 106, or virtual experience environments may be performed by a user using a I/O interface (e.g., developer interface) and with or without scripting (or with or without an application programming interface (API)). It may be noted that for purposes of illustration, characters are described as having a humanoid form. It may further be noted that characters may have any form such as a vehicle, animal, inanimate object, or other creative form.

In some implementations, the virtual experience server 102 may store characters created by users in the data store 120. In some implementations, the virtual experience server 102 maintains a character catalog and virtual experience catalog that may be presented to users. In some implementations, the virtual experience catalog includes images of virtual experiences stored on the virtual experience server 102. In addition, a user may select a character (e.g., a character created by the user or other user) from the character catalog to participate in the chosen virtual experience. The character catalog includes images of characters stored on the virtual experience server 102. In some implementations, one or more of the characters in the character catalog may have been created or customized by the user. In some implementations, the chosen character may have character settings defining one or more of the components of the character.

In some implementations, a user's character can include a configuration of components, where the configuration and appearance of components and more generally the appearance of the character may be defined by character settings. In some implementations, the character settings of a user's character may at least in part be chosen by the user. In other implementations, a user may choose a character with default character settings or character setting chosen by other users. For example, a user may choose a default character from a character catalog that has predefined character settings, and the user may further customize the default character by changing some of the character settings (e.g., adding a shirt with a customized logo). The character settings may be associated with a particular character by the virtual experience server 102.

In some implementations, the client device(s) 110 may each include computing devices such as personal computers (PCs), mobile devices (e.g., laptops, mobile phones, smart phones, tablet computers, or netbook computers), network-connected televisions, gaming consoles, etc. In some implementations, a client device 110 may also be referred to as a "user device." In some implementations, one or more client devices 110 may connect to the virtual experience server 102 at any given moment. It may be noted that the number of client devices 110 is provided as illustration. In some implementations, any number of client devices 110 may be used.

In some implementations, each client device 110 may include an instance of the virtual experience application 112, respectively. In one implementation, the virtual experience application 112 may permit users to use and interact with virtual experience server 102, such as control a virtual character in a virtual experience hosted by virtual experience server 102, or view or upload content, such as virtual experiences 106, images, video items, web pages, documents, and so forth. In one example, the virtual experience application may be a web application (e.g., an application that operates in conjunction with a web browser) that can access, retrieve, present, or navigate content (e.g., virtual character in a virtual environment, etc.) served by a web server. In another example, the virtual experience application may be a native application (e.g., a mobile application, app, or a gaming program) that is installed and executes local to client device 110 and allows users to interact with virtual experience server 102. The virtual experience application may render, display, or present the content (e.g., a web page, a media viewer) to a user. In an implementation, the virtual experience application may also include an embedded media player (e.g., a Flash® player) that is embedded in a web page.

According to aspects of the disclosure, the virtual experience application may be an virtual experience server application for users to build, create, edit, upload content to the virtual experience server 102 as well as interact with virtual experience server 102 (e.g., play virtual experiences 106 hosted by virtual experience server 102). As such, the virtual experience application may be provided to the client device(s) 110 by the virtual experience server 102. In another example, the virtual experience application may be an application that is downloaded from a server.

In some implementations, each developer device 130 may include an instance of the virtual experience application 132, respectively. In one implementation, the virtual experience application 132 may permit a developer user(s) to use and interact with virtual experience server 102, such as control a virtual character in a virtual experience hosted by virtual experience server 102, or view or upload content, such as virtual experiences 106, images, video items, web pages, documents, and so forth. In one example, the virtual experience application may be a web application (e.g., an application that operates in conjunction with a web browser) that can access, retrieve, present, or navigate content (e.g., virtual character in a virtual environment, etc.) served by a web server. In another example, the virtual experience application may be a native application (e.g., a mobile application, app, or a gaming program) that is installed and executes local to client device 130 and allows users to interact with virtual experience server 102. The virtual experience application may render, display, or present the content (e.g., a web page, a media viewer) to a user. In an implementation, the virtual experience application may also include an embedded media player (e.g., a Flash® player) that is embedded in a web page.

According to aspects of the disclosure, the virtual experience application 132 may be a virtual experience server application for users to build, create, edit, upload content to the virtual experience server 102 as well as interact with virtual experience server 102 (e.g., provide and/or play virtual experiences 106 hosted by virtual experience server 102). As such, the virtual experience application may be provided to the client device(s) 130 by the virtual experience server 102. In another example, the virtual experience application 132 may be an application that is downloaded from a server. Virtual experience application 132 may be configured to interact with virtual experience server 102 and obtain access to user credentials, user currency, etc. for one or more virtual experiences 106 developed, hosted, or provided by a virtual experience developer.

In some implementations, a user may login to virtual experience server 102 via the virtual experience application. The user may access a user account by providing user account information (e.g., username and password) where the user account is associated with one or more characters available to participate in one or more virtual experiences 106 of virtual experience server 102. In some implementations, with appropriate credentials, a virtual experience developer may obtain access to virtual experience objects, such as in-platform currency (e.g., virtual currency), avatars, special powers, accessories, that are owned by or associated with other users.

In general, functions described in one implementation as being performed by the virtual experience server 102 can also be performed by the client device(s) 110, or a server, in other implementations if appropriate. In addition, the functionality attributed to a particular component can be performed by different or multiple components operating together. The virtual experience server 102 can also be accessed as a service provided to other systems or devices through suitable application programming interfaces (APIs), and thus is not limited to use in websites.

Figure 2A:
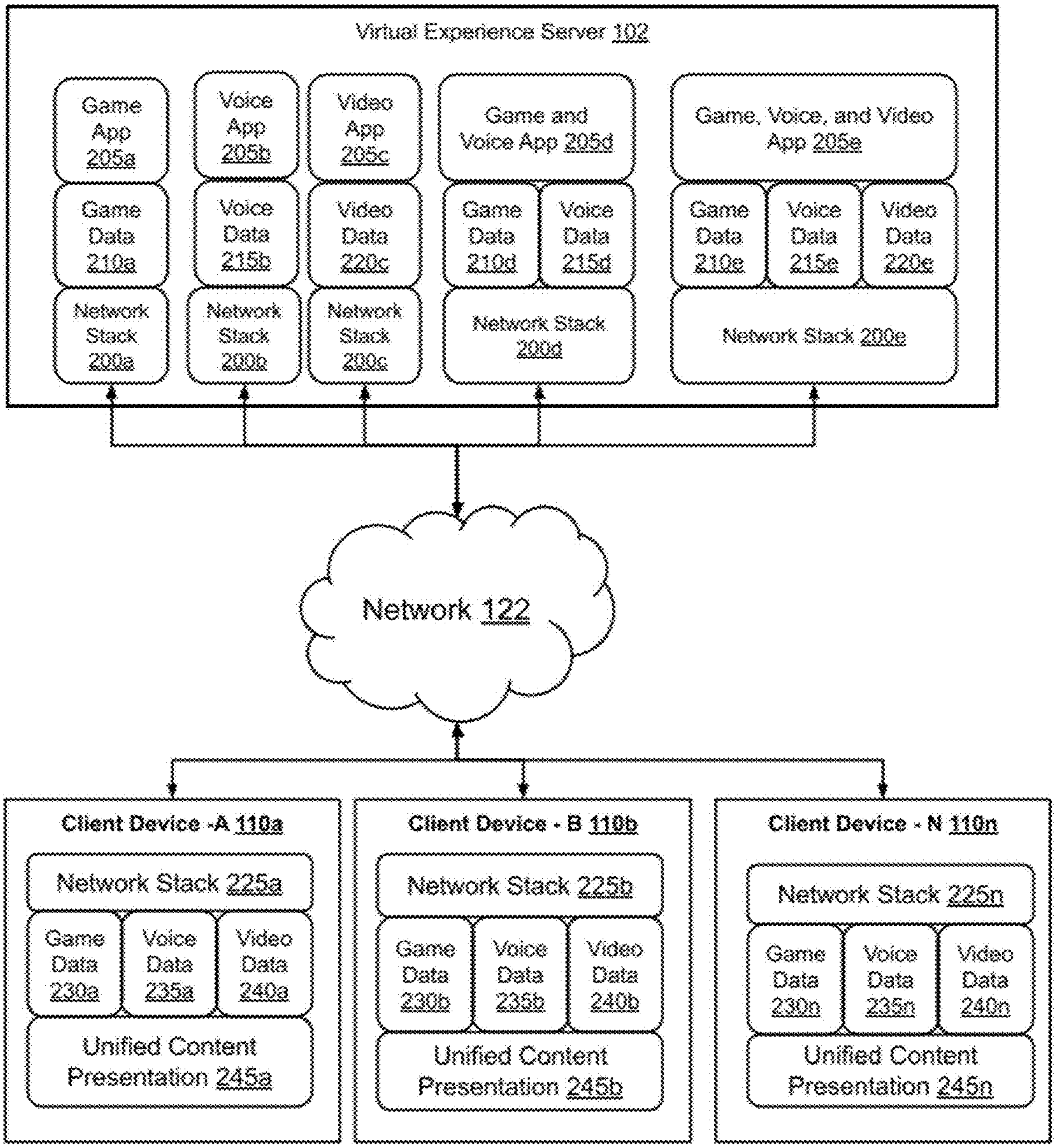
FIG. 2A is a diagram of an example system architecture to transmit application data for a virtual experience, in accordance with some implementations.

FIG. 2A is a diagram of an example system architecture to transmit application data for a virtual experience, in accordance with some implementations.

In this illustrative example, virtual experience server 102 includes multiple virtual experience application instances that are computational processes and/or threads that are utilized to generate virtual application data for one or more client devices participating in a virtual experience. Each of the application instances is coupled to an instance of a network stack that is configured to process corresponding application data.

The network stack may be implemented as (by) a service, e.g., a software service that can be implemented on a cloud computing system. Each instance of the service may be implemented as a process that is associated with a virtual experience.

A network stack service may be utilized to process application data from a combination of game applications, voice applications, and/or video applications. The application data originating from the applications can be transmitted over one or more network connections by utilizing a single network stack. A network stack service may be utilized to connect to multiple client devices.

In some implementations, multiple instances of a network stack may be utilized within a single service. On a client device, a single network stack may be utilized to connect the client device to multiple network stack services. In this illustrative example, virtual experience server 102 includes an instance of a virtual experience application game application (app) 205*a* that generates game data 210*a* and is coupled to network stack 200*a*, an instance of a virtual experience application, voice app 205*b*, that generates voice data 215*b* and that is coupled to network stack 200*b*, and an instance of a virtual experience application, video app 205*c* that generates video data 220*c* and that is coupled to network stack 200*c*. In some scenarios, a single instance of a virtual experience application can generate multiple types of application data. For example, as depicted in FIG. 2A, an instance of a virtual experience application, game and voice app (application) 205*d* is coupled to network stack 200*d* and generates game data 210*d* and voice data 215*d*, while another instance of a virtual experience application, game, voice, and video app 205*e* is coupled to network stack 200*e*, generates game data 210*e*, voice data 215*e*, and video data 220*e*.

The virtual experience server transmits application data over network 122 to one or more client devices 110. In this illustrative example, each client device 110 includes an instantiation of network stack 225 and hosts a client-side instantiation of virtual experience application, e.g., virtual experience application 112. In this illustrative example, client devices 110*a*, 110*b*, and 110*n* are coupled via network 122 to the virtual experience server 102.

Application data transmitted over network 122 is routed to respective client devices, e.g., based on headers included in packets of application data transmitted over the network. Accordingly, game data 230*a* intended for client device 110*a*, voice data 235*a* intended for client device 110*a*, and video data 240*a* intended for client device 110*a* are received at client device 110*a* via network stack 225*a*. Similarly, game data 230*b* intended for client device 110*b*, voice data 235*b* intended for client device 110*b*, and video data 240*b* intended for client device 110*b* are received at client device 110*b* via network stack 225*b*; and game data 230*n* intended for client device 110*n*, voice data 235*n* intended for client device 110*n*, and video data 240*n* intended for client device 110*n* are received at client device 110*n* via network stack 225*n*.

The virtual experience application at the respective client device(s) includes processes (threads) associated with the processing of game data 230, voice data 235, and video data 240.

The virtual experience is presented on the client device based on the received application data via unified content presentation 245, e.g., on a display screen of the client device that includes updates to a game received as game data 230, video content received as video data 240, and voice data 235 is played back on a speaker of the client device.

Figure 2B:
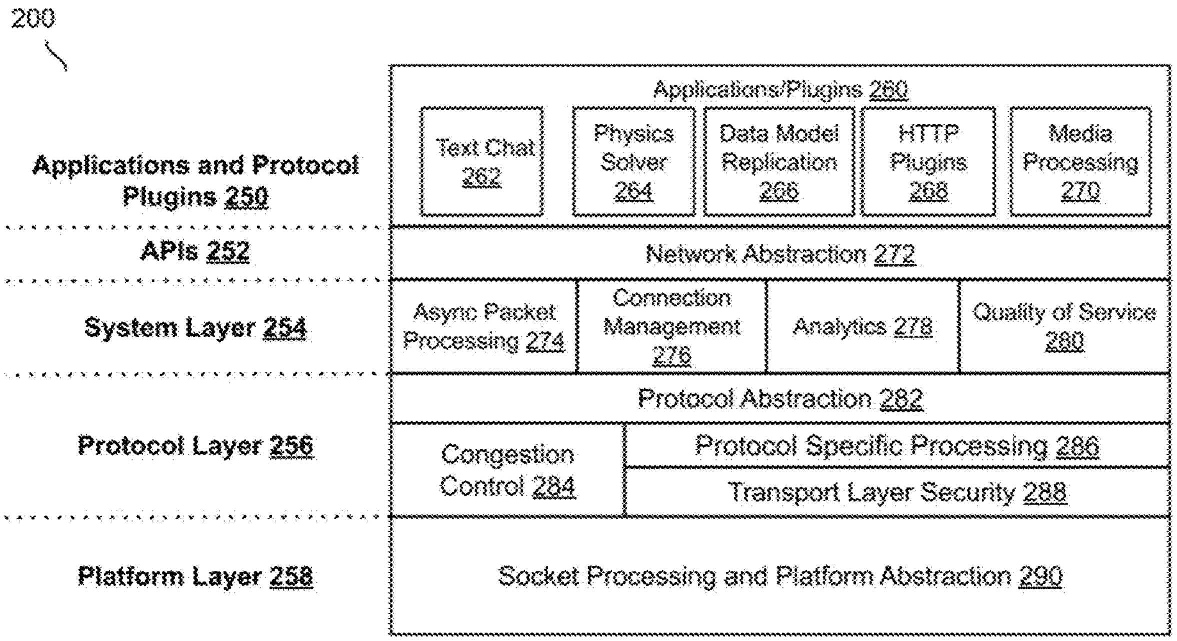
FIG. 2B illustrates an example network stack for the transmission of application data over a network connection, in accordance with some implementations.

FIG. 2B depicts an example network stack for the transmission of application data over a network connection, in accordance with some implementations.

Network stack 200 is utilized to define and enable communication of application data generated by software applications implemented in computing devices and that generate application data for transmission to other devices, e.g., client devices. The network stack can be implemented at either or both of server and client devices and can be utilized to handle the transmission and reception of application data over a network. In some implementations, the network stack is implemented as part of the application executable (user space) and thereby, is compatible with multiple operating system kernels.

As depicted in FIG. 2B, the network stack is realized by three layers of functionality; a system layer 254, a protocol layer 256, and a platform layer 258. Implementation details of functions in each layer are abstracted such that the functions in each layer can be changed without affecting functionality in other layers. Additionally, application and protocol plugins 250 and application programming interfaces (APIs) 252 are provided.

Plugins 250 can include application plugins 260, such as one or more of text chat 262, physics solver 264, data model replication plugin 266, HTTP plugins 268, media processing plugin 270, etc.

- Text Chat plugin: processes per user stream of ordered unreliable text messages
- Physics Solver: sends and receives physics updates as generated by physics engine on client and server
- Data Model replication: sends and receives updates to a data model that includes property updates, terrain updates, events which could be reliable or unreliable.
- HTTP: sends standards-compliant client generated requests and receives responses.
- Media processing: sends and receives RTP stream APIs 252 can provide network abstraction 272. Application plugins 260 use the APIs to provide a network address/URI they are attempting to communicate with, create data streams with certain reliability, ordering, and priority characteristics, and send and receive datagrams. The network stack then performs necessary operations like selecting an appropriate network protocol (TCP, UDP, etc.), creating new connections, and multiplexing traffic from different applications on the same connection where possible and desirable. These operations are handled entirely by the network stack and not exposed to application plugins.

APIs 252 include a module for network abstraction 272, that enable applications and protocol plugins to access the network stack. Some example categories of APIs that can be utilized for applications and plugins include asynchronous data send and receive, connection management with security, QoS configuration, and analytics.

One or more applications and/or protocol plugins 250 may be connected to the system layer 252 via APIs 252. For example, the applications can include text chat application 262, physics solver 264, data model replication application 256, HTTP plugins 268, and modules for media processing 270. The modules for media processing 270 can include media processing libraries, e.g., voice/video codecs, echo cancellation (EC) modules, noise cancellation (NC) modules, etc.

In some implementations, the applications can include selective forwarding units (SFUs), a type of media server that receives application data from multiple participants in a shared virtual experience, and selectively forwards the application data to the participants, as well as Multipoint Control Units (MCUs) that receive application data from multiple participants in a shared virtual experience which is then broadcast to all the participants.

System layer 254 is utilized to perform processing of application data received from various applications and prepare suitable data streams to be provided to the protocol layer. System layer 254 includes support for asynchronous (async) packet processing 274, connection management 276, analytics 278, and modules for monitoring quality of service 280.

The system layer 254 is utilized to provide asynchronous application program interfaces (APIs) to applications, connection management services, configure and maintain streams/channels within network connections, and determine parameters to monitor quality of service (QoS) for the network connection. The system layer enables seamless scaling using a lockless actor-based design wherein each network connection is modeled as an actor and provided with an independent thread context to execute.

The system layer 254 can be utilized to support a variety of networking use cases and is designed to be agnostic to the higher-level application that generates the application data and the lower-level protocols in use. The system layer 254 is responsible for providing asynchronous application program interfaces (APIs) 252 via network abstraction 272 to multiple applications as well as managing concurrent execution of individual connections, handling network connection creation and destruction, determination of analytics, and managing quality of service over the network connection.

One or more threads are maintained by system layer 254. The threads may be utilized to monitor readability and/or writability on various file descriptors as needed by established connections or listeners and utilize the platform layer APIs and implementations. The system layer waits for events and suitable actions may be scheduled for the protocol layer, e.g., for the processing of transmit (send) queues, reading and processing from the socket(s), etc.

Protocol layer 256 includes a module that performs protocol abstraction 282, a module for congestion control 284, a module for transport layer security 288, and module(s) for protocol specific processing 286. The function of the protocol layer 256 is to handle protocol mechanics and all associated functionality to process messages that are communicated over a network connection. Protocol layer 256 is utilized to process message structure taking into account specifics of the corresponding network protocol and network security parameters.

The protocol abstraction module 282 includes an abstraction layer that is utilized by modules/functions within the system layer to communicate with the suitable protocol for the application.

The protocol specific processing 286 may be performed via one or more modules/plugins that are configured to process data based on the specific protocol associated with the particular application data. Additional protocol modules may be provided within the protocol specific processing 286 for applications that require specialized handling of application data, e.g., http, real-time protocols such as Real-time Transport Protocol (RTP), RTP Control Protocol (RTCP), etc.

For example, Hypertext Transfer Protocol (HTTP) application data is commonly utilized in game engines and can be handled by the network stack. HTTP/3, a version of the Hypertext Transfer Protocol (HTTP) that utilizes QUIC based connections can also be supported by the protocol layer with APIs after being processed by protocol socket processing and platform abstraction module 290. This enables the common system layer functions to process application data based on the HTTP/3 protocol seamlessly.

For certain applications that utilize a HTTP protocol, a HTTP plugin may be provided to provide a more structured HTTP GET/POST interface. The plugin is also utilized to handle retry and throttling.

Platform layer 258 includes a socket processing and platform abstraction module 290. The socket processing and platform abstraction module 290 is utilized to perform an abstraction of all operating system (OS) dependent functionality, e.g., socket/network Input-Output (IO), file IO, other platform dependent functionality like clocks, threads, etc.

The platform layer 258 is utilized to abstract (hide) OS specificity and to provide platform independent APIs for the higher layers. The platform layer is utilized to house platform-dependent functionality like socket operations, epoll-based event-loop, etc.

The platform layer enables porting to different platforms without changes to the layers of the network stack. The platform layer is the outermost layer and is utilized to interface with external networks.

Figure 3:
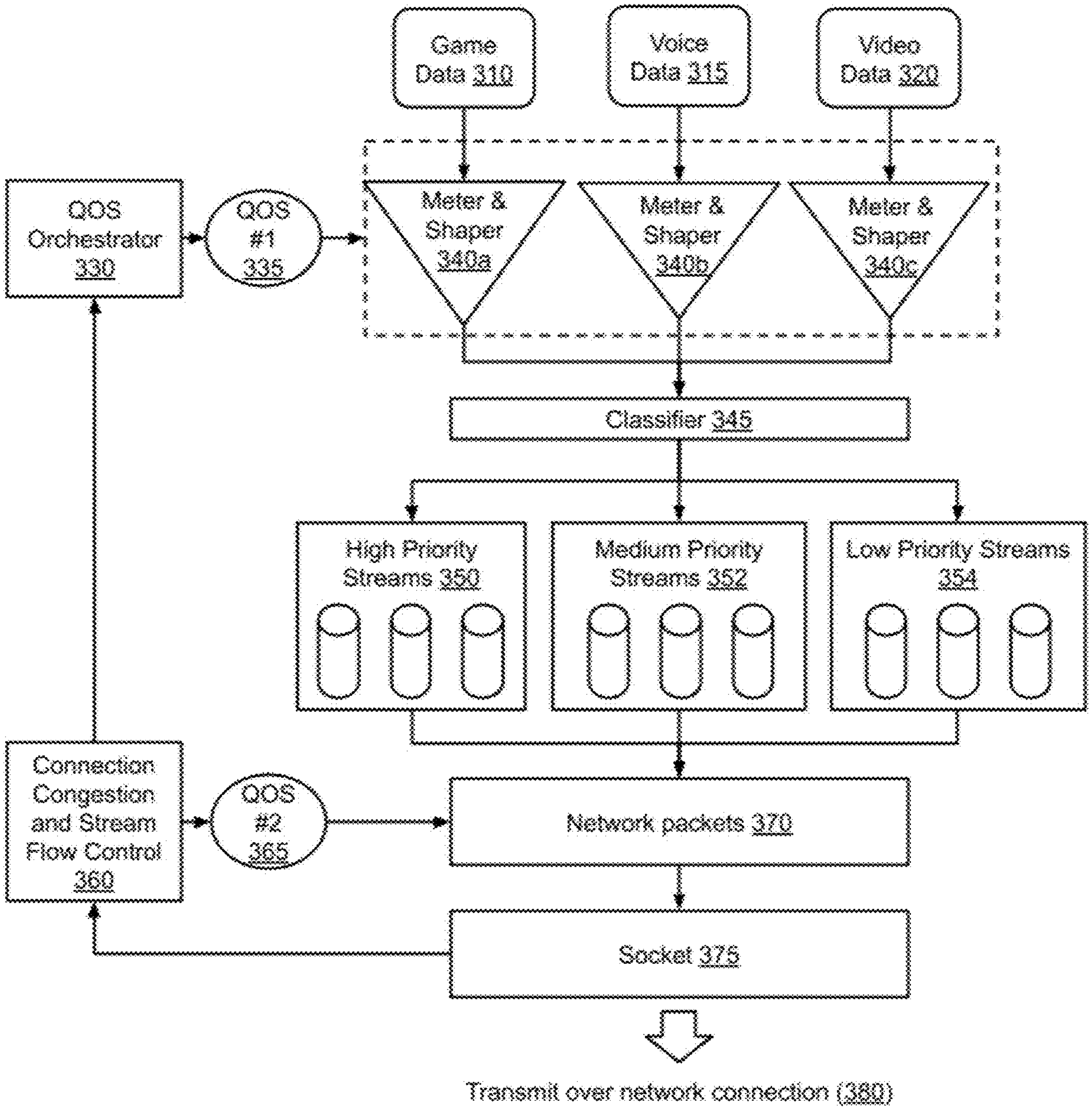
FIG. 3 illustrates an example workflow for the transmission of multimedia application data over a network connection, in accordance with some implementations.

FIG. 3 illustrates an example workflow for the transmission of multimedia application data over a network connection, in accordance with some implementations.

In this illustrative example, application data includes game data 310, voice data 315, and video data 320. The application data may be received as datagrams and is received at a respective meter and shaper 340; game data 310 is received at meter and shaper 340*a*, voice data is received at meter and shaper 340*b*, and video data 320 is received at 340*c*. The metering and shaping are performed based on data allocation rates provided by Quality of Service (QOS) orchestrator 330 via QOS #1 module 335.

QOS orchestrator 330 receives connection congestion and stream level flow control information from congestion and stream level flow control module 360.

Datagrams received at the meter and shapers 340 are metered and shaped based on the permitted data rates and provided to classifier 345. Metering and shaping operations can be performed for data transmission (datagrams) for a single network connection, as well as for multiple connections. Identifier metadata associated with the datagram is utilized by classifier 345 to determine the associated stream of the datagram. The datagram is then added to the stream queue 350 matching its identifier.

In some implementations, each datagram has a stream identifier. The stream identifier is associated with a traffic class. The traffic class is utilized by the classifier to assign the datagram to a suitable queue. In some implementations, the traffic can be classified into high, medium, and low priorities based on the originating application for the datagram. A classification is performed based on properties of the datagram and subsequently queued for transmission.

In this illustrative example, a total of nine streams are depicted; three high priority streams 350, three medium priority streams 352, and three low priority streams 354. At each priority level, there may be a collection of streams that includes datagrams from different applications.

A QOS #2 module 365 receives stream level flow control and connection congestion information from congestion and stream level flow control module 360, and based on the stream level flow control information, datagrams from the respective streams are selected by QOS #2 module 365 for onward transmission.

The datagram selected for onward transmission is appended to a network packet 370 with data headers suitable for the network connection's protocol. If the selected datagram is larger than the maximum network packet size, only the portion of the datagram that can be included within the network packet is appended. The datagram, or a portion of the datagram, is then removed from the queue.

If the selected datagram is smaller than the maximum network packet size, the QOS #2 module 365 selects the next datagram for onward transmission, which is also appended to the network frame. This process is repeated until no more data can be appended to the network packet, or until no more datagrams remain in any of the queues.

Network packets 370 are then provided to socket 375 to be transmitted (380) over a network connection.

Additionally, a duplex control stream may be created for each network connection to enable control plane communications between devices, e.g., about data streams.

For example, a control stream may be utilized to notify remote peer devices (peers) about the creation of a new unreliable traffic identifier(s) (traffic indicator associated with traffic that is intended to be transmitted as an unreliable data packet). When a new unreliable identifier is requested by a local application, a control message may be transmitted to the remote peer device to notify (inform) the remote peer device of the creation of the new unreliable identifier. A first portion of the control message is the control message type, and may be utilized by the remote network stack to determine how to parse the rest of the control message.

In some implementations, an application identifier is included in the control message to inform the remote peer device as to which application the new traffic identifier is dedicated to. An application traffic identifier, chosen by the local application requesting the new traffic identifier, is included for identification by the remote application. A unique traffic identifier, chosen by the local network stack, is included for identification by the remote network stack.

Figure 4:
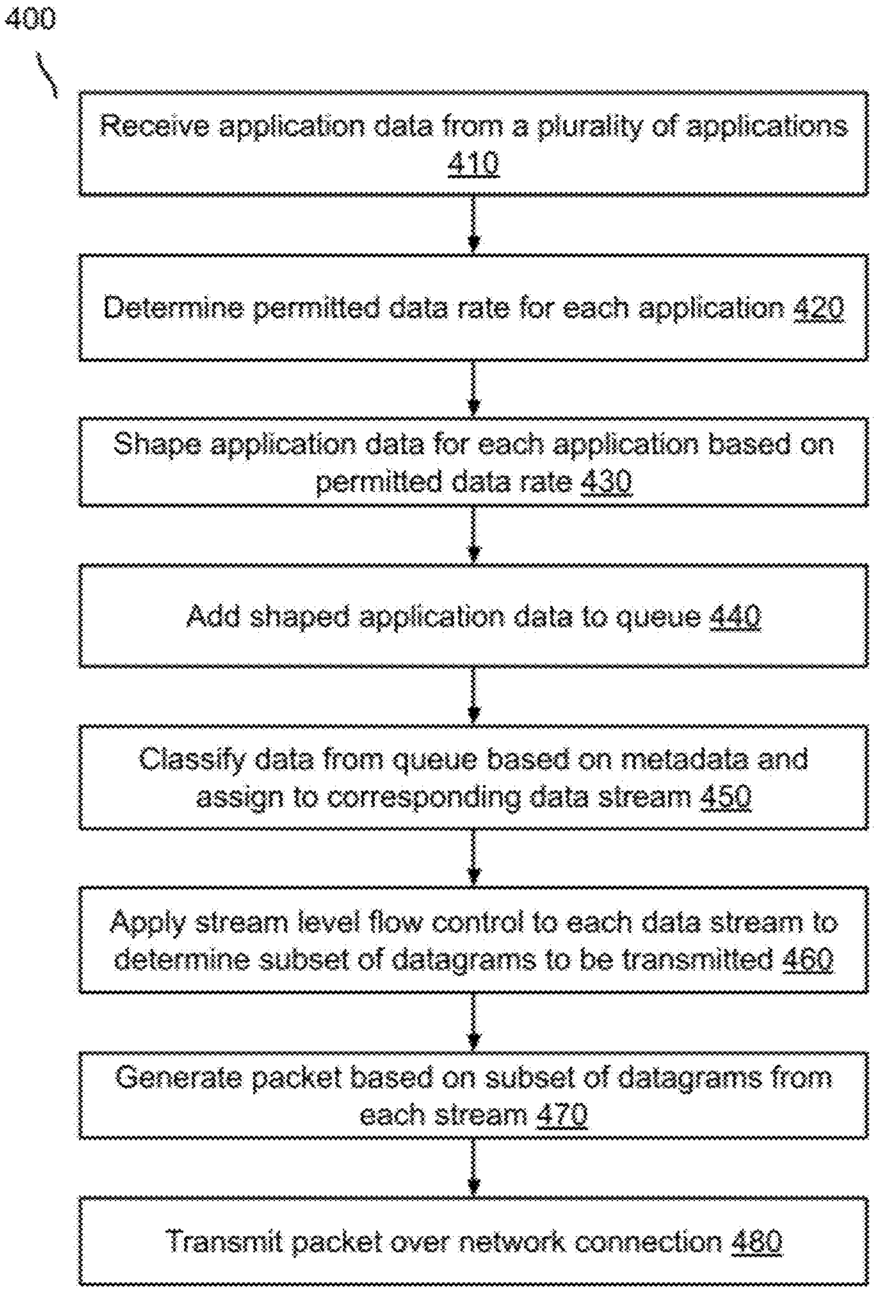
FIG. 4 is a flowchart that illustrates an example method to transmit multimedia application data over a network connection, in accordance with some implementations.

FIG. 4 is a flowchart that illustrates an example method to transmit multimedia application data over a network connection, in accordance with some implementations.

In some implementations, method 400 can be implemented to perform transmission of multimedia data as part of a virtual experience, for example, on virtual experience server 102 described with reference to FIG. 1. For example, method 400 may be utilized to transmit multiverse application data between a server device and a client device in a virtual experience platform that includes a client-server architecture to support streaming of virtual content. In some other implementations, method 400 can be implemented, for example, on one or more devices described with reference to FIG. 1. In described examples, the implementing system includes one or more digital processors or processing circuitry ("processors"), and one or more storage devices (e.g., a data store 120 or other storage). In some implementations, different components of one or more servers and/or clients can perform different blocks or other parts of the method 400. In some examples, a first device is described as performing blocks of method 400. Some implementations can have one or more blocks of method 400 performed by one or more other devices (e.g., other client devices or server devices) that can send results or data to the first device.

Method 400 may begin at block 410. In some implementations, the network connection is one that has been previously established between a first endpoint device, e.g., a server, and a second endpoint device, e.g., a client device. At block 410, application data may be received from a plurality of applications, e.g., at a server device.

In some implementations, receiving the application data from each application of a plurality of applications can include receiving one or more datagrams from each application. The application data may be received at a network stack from the plurality of applications. The applications may execute on the server device, other server devices, or one or more client devices.

In some implementations, a leaky bucket algorithm may be applied to the application data received from each application. Use of the leaky bucket algorithm may enable implementation of a memory efficient network stack since a fixed-sized bucket is utilized to receive application data from each application.

Different applications generate application data (datagrams) that may have different levels of sensitivity (tolerance) to one or more attributes of network transmission of the application data, e.g., audio chat data and video chat are real time data where the delays need to meet a predetermined delay threshold; text chat data may tolerate a level delay greater than that for audio chat data and video chat data; game physics data is real time data but can tolerate some packet loss, game asset data transmission may tolerate some delay but not packet loss, etc.

In some implementations, the plurality of applications can include a first real-time application with a first level of latency tolerance (e.g., audio application/video application); a second application with a second level of latency tolerance (e.g., game physics application, text chat application); and a third application with a third level of latency tolerance (e.g., background data transfer such as file transfer, asset download).

In some implementations, the plurality of applications includes at least a first application and a second application, wherein application data received from the first application includes a first set of datagrams with a first level of latency tolerance and wherein application data received from the second application includes a second set of datagrams with a second level of latency tolerance different from the first level of latency tolerance.

For example, the first application may be an application that utilizes text data and that has a first level of latency tolerance, e.g., a relatively high tolerance for latency, and the second application may be an application that utilizes voice data and has a second level of latency tolerance, e.g., a relatively low tolerance for latency when compared to the first application. At different times, the same application may exhibit different behavior, e.g., "text data" when a user is reading text or text chatting other users; "voice data" when the user is voice chatting with other users; etc.

In some implementations, the application data received from the first application includes a first set of datagrams with a first level of packet loss tolerance and wherein application data received from the second application includes a second set of datagrams with a second level of packet loss tolerance.

For example, the first application may generate voice data and which has a first level of packet loss tolerance, e.g., a relatively high tolerance for packet loss, and the second application may be a data model replicator engine that generate virtual object data model data which has a second level of packet loss tolerance different from the first level of packet loss tolerance, e.g., a relatively low tolerance for packet loss, since user experience is likely to be significantly affected if data model updates are not received at a client device.

In some implementations, a single application can generate application data (e.g., datagrams) with different metadata attributes. For example, a game engine can generate a datagram that includes event information data (e.g., a soccer ball hitting a goalpost) that is tagged to have a low (or zero) tolerance for packet loss. The game engine can also generate updates to the position of the soccer ball that may be tagged to have a high tolerance for packet loss (since missing a single update may not affect the user experience much, particularly if a subsequent update has been received at the client device), but a low tolerance for delay (since receiving delayed packets may negatively affect user experience significantly).

In some implementations the plurality of applications includes two or more of a video application, an audio application, and a game application. Block 410 may be followed by block 420.

At block 420, a permitted data rate for each application of the plurality of applications is determined. Determining the permitted data rate for each application of the plurality of applications may include determining the permitted data rate based on a connection bit rate of the network connection and a predetermined allocation ratio that apportions available bandwidth between the plurality of applications. Block 420 may be followed by block 430.

At block 430, the application data received from each application of the plurality of applications is shaped based on the permitted data rate for the application into respective shaped application data. In some implementations, shaping the application data received from each application includes adding a metered quantity of the received application data that corresponds to the permitted data to the queue.

In some implementations, the shaping of the application data includes metering (measuring) the application data received from each application and determining a quantity of application data that can be transmitted from the application for a next time period of transmission. In some implementations, the permitted data rate for each application is determined based on a predetermined allocation of data across the applications and a permitted total data rate for the network connection.

In some implementations, application data from an application that is not included in the shaped application data may be stored in a buffer, e.g., an application-specific buffer. In some implementations, if the application data that is not included in the shaped application data exceeds the capacity of the application-specific buffer, back pressure may be applied to the application. In some implementations, the back pressure may be applied by transmission of an indicator or signal to the application that the application data was not added to the pre-shaper queue. This may stop the particular application from sending data to the network stack. This provides feedback to the application and the application may make adjustments to limit generation of additional data and provides advantages over data transmission methods where such early feedback is not provided to the application. Block 430 may be followed by block 440.

At block 440, the shaped application data associated with each application is added to a queue. In some applications, the queue is a blended queue that includes datagrams received from all the applications associated with the network connection. Block 440 may be followed by block 450.

At block 450, data from the queue is classified based on metadata and assigned to a particular data stream of a plurality of data streams associated with the network connection. In some implementations, assigning datagrams included in the queue to the corresponding data stream of the plurality of data streams based on metadata associated with each datagram may include classifying the datagrams in the queue based on one or more of a reliability indicator and a priority indicator associated with the datagrams.

In some implementations, the reliability indicator and/or priority indicator may be based on metadata associated with each datagram that is assigned at the application that generated the datagram. In some implementations, the reliability indicator and/or priority indicator may be automatically inferred by the network stack based on the originating application.

In some implementations, the data streams include a set of reliable data streams and a set of unreliable (best effort) data streams. In some implementations, the data streams may include a single set of data streams.

Block 450 may be followed by block 460.

At block 460, stream level flow control is applied to each data stream of the plurality of data streams to identify a subset of datagrams from each data stream to be transmitted over the network connection. The subset of datagrams from each data stream is based on a stream level data flow rate that is determined for the next transmission period of the network connection by the network stack. In some implementations, a stream level flow control is applied such that only a single datagram may be queued at a stream level queue.

In some implementations, applying the stream level flow control to each data stream of the plurality of data streams can include skipping one or more blocked data streams such that no datagrams from the blocked data streams are included in the subset of datagrams to be transmitted. In some implementations, the determination of a blocked data stream may be based on flow control information received for the data stream.

In some implementations, data streams with spare capacity may be utilized for the transmission of datagrams with a different priority indicator and/or reliability indicator than the priority indicator and/or reliability indicator associated with the data stream if there are no datagrams to be transmitted for the data stream. For example, if a high priority data stream is yet to be filled to capacity, and there are no high priority datagrams to be processed, a datagram with a lower priority indicator may be added to utilize the spare capacity of the data stream.

In some implementations, prior to applying the stream level flow control to each data stream of the plurality of data streams, connection level flow control may be applied to determine a connection level data rate for the network connection.

Block 460 may be followed by block 470.

At block 470, a packet is generated to be transmitted over the connection, wherein the packet includes the subset of datagrams from at least two data streams of the plurality of data streams. In some implementations, the subset of datagrams can include a portion of a datagram received from an application, e.g., a truncated datagram. For example, if the addition of a portion of a datagram results in a packet capacity being met, a truncated portion of the datagram is included in the packet, and the remainder of the datagram may be transmitted during a subsequent transmission interval. Block 470 may be followed by block 480.

At block 480, the packet is transmitted over the network connection.

Blocks 410-480 can be performed (or repeated) in a different order than described above and/or one or more steps can be omitted. For example, in some implementations, blocks 420 and 430 may be performed either serially on a per application basis or in parallel.

Figure 5A:
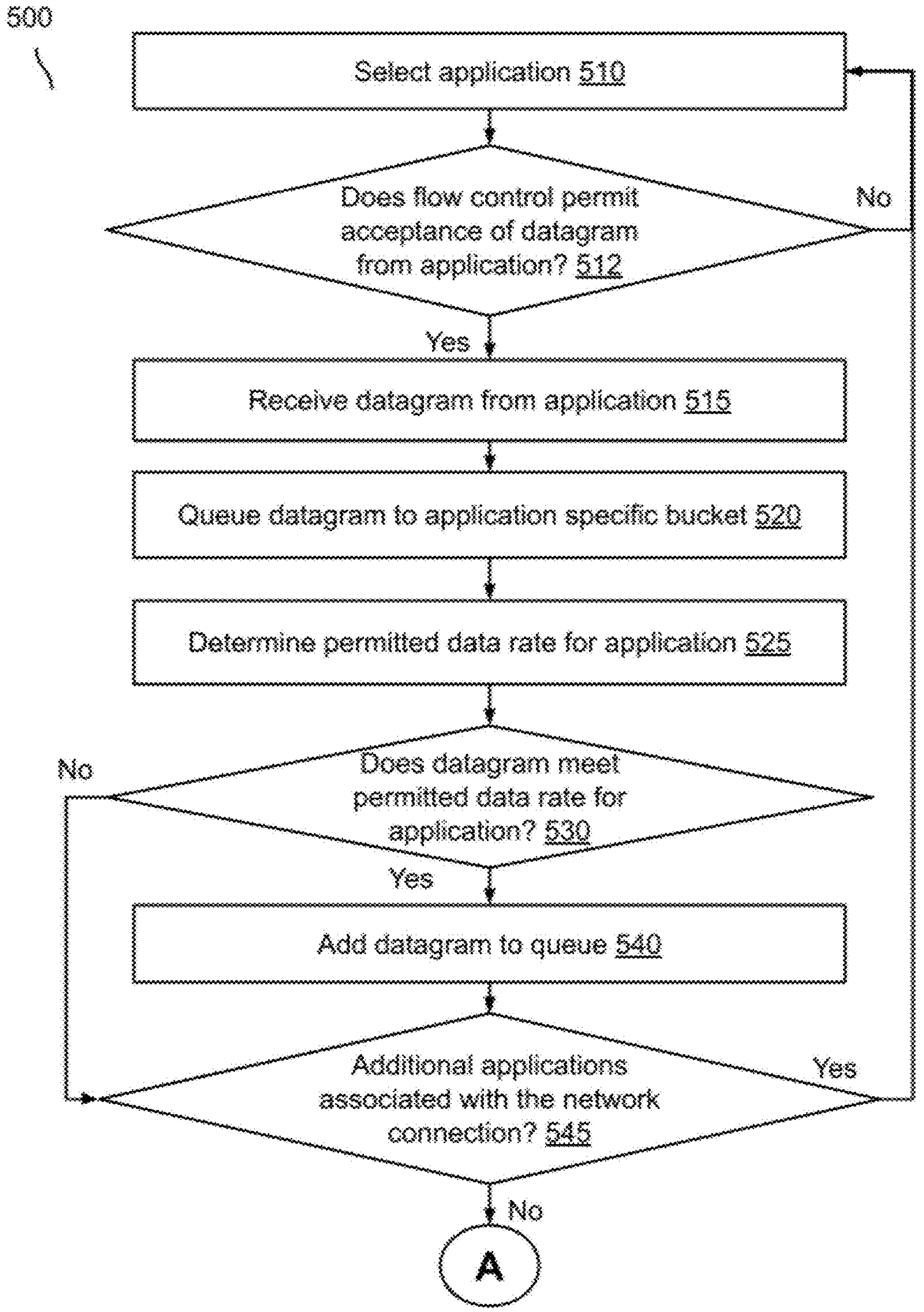
FIGS. 5A and 5B is a flowchart that illustrates another example method to transmit multimedia application data over a network connection, in accordance with some implementations.
Figure 5B:
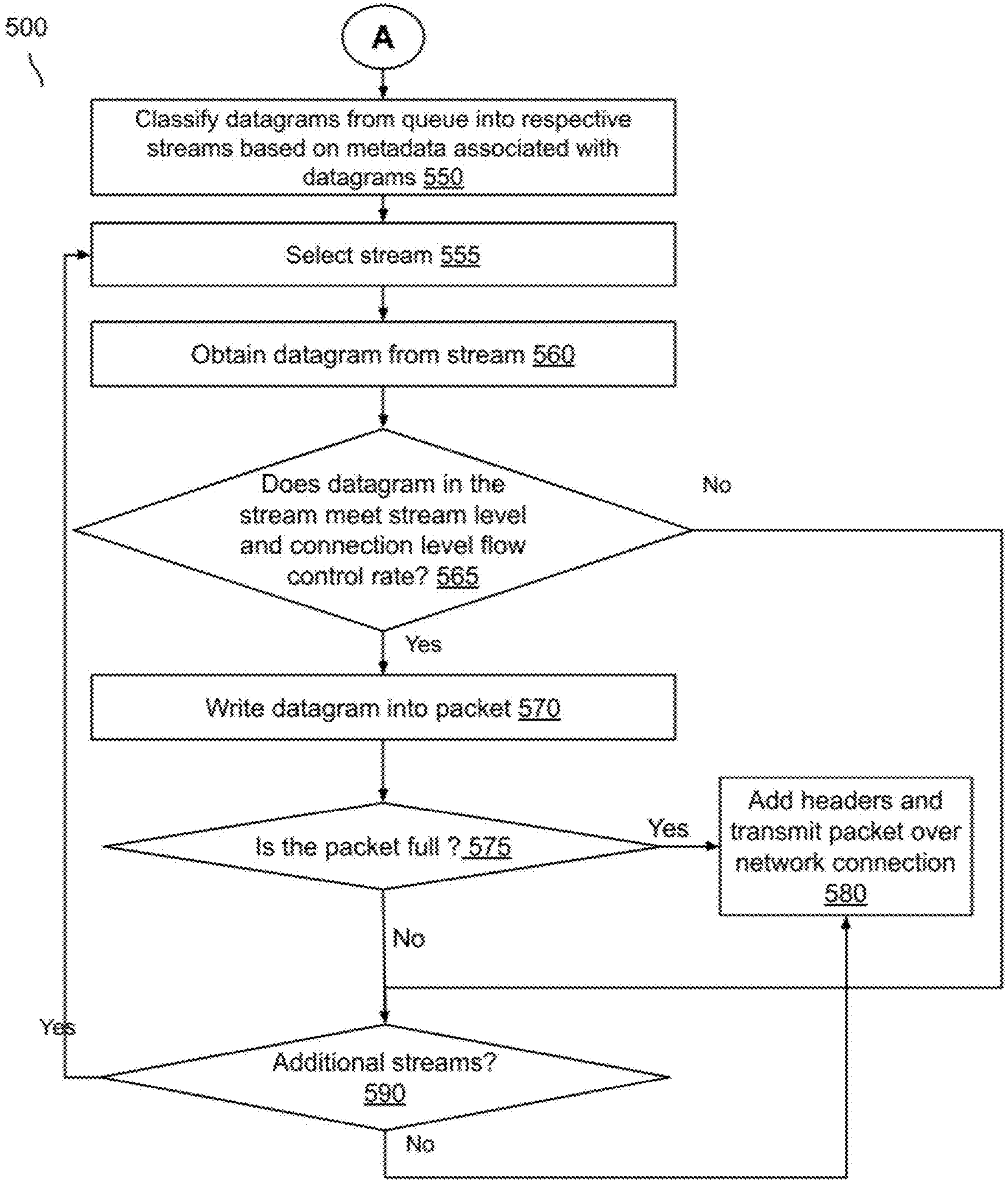

FIGS. 5A and 5B is a flowchart that illustrates another example method to transmit multimedia application data over a network connection, in accordance with some implementations.

In some implementations, method 500 can be implemented to transmit application data over a network connection between one or more computing devices, e.g., between a server device and one or more client devices as part of a virtual experience, for example, on virtual experience server 102 described with reference to FIG. 1. For example, method 500 may be utilized to transmit application data over a network connection in a virtual experience platform that includes a client-server architecture to support streaming of virtual content. In some other implementations, method 500 can be implemented, for example, on one or more devices described with reference to FIG. 1. In described examples, the implementing system includes one or more digital processors or processing circuitry ("processors"), and one or more storage devices (e.g., a data store 120 or other storage). In some implementations, different components of one or more servers and/or clients can perform different blocks or other parts of the method 500. In some examples, a first device is described as performing blocks of method 500. Some implementations can have one or more blocks of method 500 performed by one or more other devices (e.g., other client devices or server devices) that can send results or data to the first device.

Method 500 may begin at block 510. At block 510, an application of a plurality of applications that generate application data (datagrams) is selected for processing. The plurality of applications can include different applications, e.g., a game application, a voice application, video application, text chat application, etc. Block 510 may be followed by block 512.

At block 512, it is determined whether flow control permits acceptance of datagram from an application. The flow control is determined based on processing queues at the receiver device side. For example, it is determined whether adding the datagram from the application would result in the data rate for the network connection meeting a permitted flow control data rate for the network connection for the next transmission period. If it is determined that adding the datagram from the application would result in the data rate for the network connection meeting the permitted flow control data rate for the network connection, then block 512 may be followed by block 515, else block 512 may be followed by block 510.

At block 515, a datagram is received from the application. Block 515 may be followed by block 520.

At block 520, the datagram is queued to an application specific queue. In some implementations, the application specific queue may be an application specific leaky bucket. Block 520 may be followed by block 525.

At block 525, a permitted data rate for a next period of transmission is determined for the particular application. For example, in some implementations, the permitted data rate may be determined for a subsequent transmission window (e.g., the next transmission window) for the network connection. As an example, the subsequent transmission window may be the next 16 ms transmission window for the network connection. Block 525 may be followed by block 530.

At block 530, it is determined whether adding the datagram would result in the data rate for the application meeting (e.g., less than or equal to) the permitted data rate for the application for the next transmission period.

If it is determined that adding the datagram would result in the data rate for the application meeting the permitted data rate for the application, then block 530 may be followed by block 540, else block 530 may be followed by block 545.

At block 540, the datagram is added to a queue of datagrams. The queue of datagrams is a single blended queue of datagrams from all applications associated with the network connection. Block 540 may be followed by block 545.

At block 545, it is determined whether there are additional applications associated with the network connection. If it is determined that there are additional applications associated with the network connection, block 545 may be followed by block 510, else block 545 may be followed by block 550.

At block 550, datagrams from the blended queue are added to respective data stream queues based on metadata associated with the datagrams. Block 550 may be followed by block 555.

At block 555, a particular data stream is selected. Block 555 may be followed by block 560. At block 560, a datagram is obtained from the stream. Block 560 may be followed by block 565.

At block 565, it is determined whether the datagram in the data stream meets the stream level flow control rate for the particular data stream. If it is determined that the datagram meets the stream level flow control rate for the particular data stream, block 565 may be followed by block 570, else block 565 may be followed by block 590.

At block 570, the datagram, or a portion of the datagram is written to a packet. Block 570 may be followed by block 575.

At block 575, it is determined whether the packet is full, e.g., has reached a predetermined threshold size. If it is determined that the packet is full, block 575 may be followed by block 580, else block 575 may be followed by block 590.

At block 580, suitable data headers are added to the packet and the packet transmitted over the network connection.

At block 585, it is determined whether there are additional datagrams in the data stream being processed. If it is determined that there are additional datagrams in the data stream being processed, block 585 may be followed by block 560, else block 585 may be followed by block 590.

At block 590, it is determined whether there are additional data streams to be processed. If it is determined that there are additional streams to be processed or if the data stream just processed has additional data to be transmitted, block 590 may be followed by block 555, else block 590 may be followed by block 580.

Blocks 510-590 can be performed (or repeated) in a different order than described above and/or one or more steps can be omitted.

Figure 6:
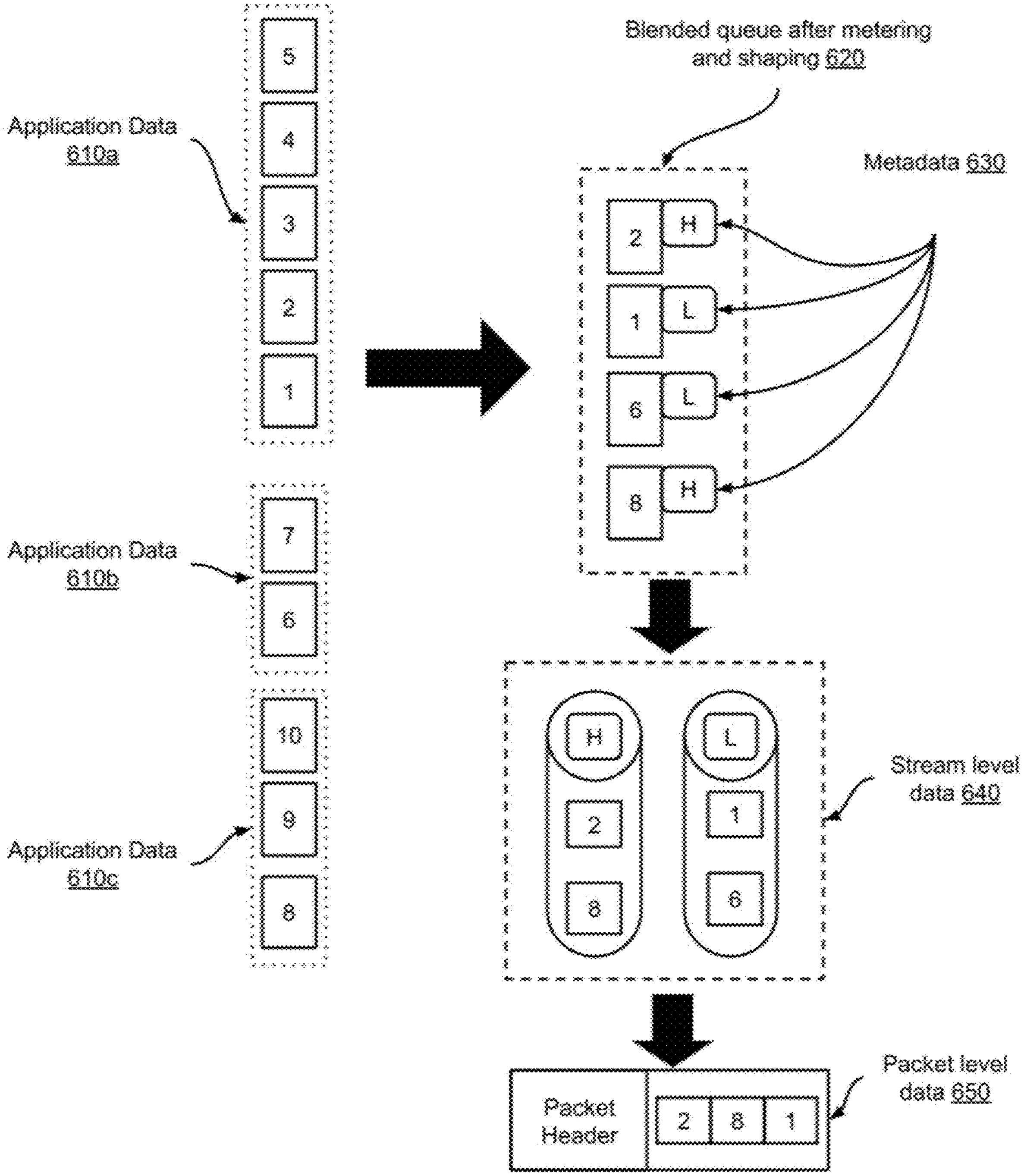
FIG. 6 illustrates an example of transmission of application data over a network connection, in accordance with some implementations.

FIG. 6 depicts example transmission of application data over a network connection, in accordance with some implementations.

This is an illustrative example based on a simplified network stack and is utilized to illustrate the implementation of the network stack described in this disclosure.

In this illustrative example, application data (datagrams) 610*a*, 610*b*, and 610*c* are received from three different applications. Application data 610*a* includes datagrams numbered 1, 2, 3, 4, and 5. Application data 610*b* includes datagrams numbered 6 and 7. Application data 610*c* includes datagrams numbered 8, 9, and 10.

The application data from each application is shaped and metered, e.g., as described with reference to operations performed in block 430 in FIG. 4. A permitted data rate is determined for each application, and datagrams corresponding to the determined permitted data rate are added to a single blended queue 620.

In this example, two datagrams (1 and 2) from application data 610*a*, a single datagram (6) from application data 610*b*, and a single datagram (8) from application data 610*c* are added to the blended queue.

Metadata 630 associated with each datagram is utilized to classify the datagrams and assign them to specific streams. For example, the datagrams may be associated (tagged) with metadata indicative of whether they are of high priority (denoted by 'H') or of low priority (denoted by 'L').

In this illustrative example, the network stack includes determining stream level data 640 that includes two streams to which datagrams from the blended queue are added. The datagrams marked 2 and 8 are added to the high priority (H) stream whereas the datagrams marked 1 and 6 are added to the low priority (L) stream.

Each stream may have a permitted stream level flow rate that is utilized to determine a data rate for each stream. In this example, the stream level flow between the H stream and the L stream is specified to be a ratio of 2:1, e.g., 2 datagrams from the H stream are selected for 1 data from the L stream. Additionally, for this example, the size of the packet for transmission is set to be 3 datagrams.

Accordingly, datagrams 2 and 8 from the H stream and datagram 1 from the L stream are added to a packet. A packet header may be attached, and the packet readied for onward transmission, e.g., via a network socket.

As can be observed in this example, the determination of a single queue is performed while being agnostic to metadata associated with the data and the sorting into streams and packets is performed in a manner agnostic to the original application that generated the datagram. This enables a simplified workflow that can balance the priority of respective application data with network connection conditions and enable a single network stack to efficiently be utilized for the transmission of multimedia data.

Figure 7:
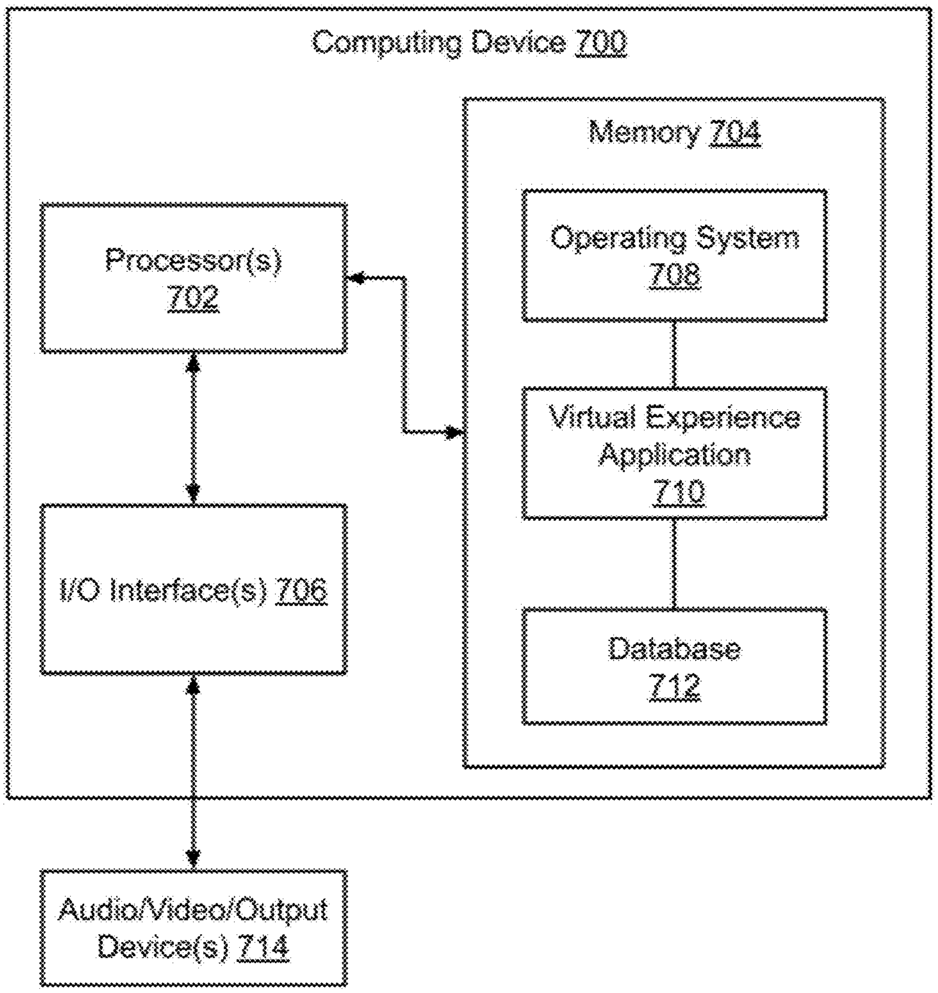
FIG. 7 is a block diagram that illustrates an example computing device, in accordance with some implementations.

FIG. 7 is a block diagram of an example computing device 700 which may be used to implement one or more features described herein. In one example, device 700 may be used to implement a computer device (e.g. 102 and/or 110 of FIG. 1), and perform appropriate method implementations described herein. Computing device 700 can be any suitable computer system, server, or other electronic or hardware device. For example, the computing device 700 can be a mainframe computer, desktop computer, workstation, portable computer, or electronic device (portable device, mobile device, cell phone, smartphone, tablet computer, television, TV set top box, personal digital assistant (PDA), media player, virtual experience device, wearable device, etc.). In some implementations, device 700 includes a processor 702, a memory 704, input/output (I/O) interface 706, and audio/video input/output devices 714.

Processor 702 can be one or more processors and/or processing circuits to execute program code and control basic operations of the device 700. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 704 is typically provided in device 700 for access by the processor 702, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 702 and/or integrated therewith. Memory 704 can store software operating on the server device 700 by the processor 702, including an operating system 708, one or more applications 710, e.g., a virtual experience application, and application database 712. In some implementations, application 710 can include instructions that enable processor 702 to perform the functions (or control the functions of) described herein, e.g., some or all of the methods described with respect to FIGS. 4, 5A, and 5B.

Elements of software in memory 704 can alternatively be stored on any other suitable storage location or computer-readable medium. In addition, memory 704 (and/or other connected storage device(s)) can store instructions and data used in the features described herein. Memory 704 and any other type of storage (magnetic disk, optical disk, magnetic tape, or other tangible media) can be considered "storage" or "storage devices."

I/O interface 706 can provide functions to enable interfacing the server device 700 with other systems and devices. For example, network communication devices, storage devices (e.g., memory and/or data store 120), and input/output devices can communicate via interface 706. In some implementations, the I/O interface can connect to interface devices including input devices (keyboard, pointing device, touchscreen, microphone, camera, scanner, etc.) and/or output devices (display device, speaker devices, printer, motor, etc.).

The audio/video input/output devices 714 can include a user input device (e.g., a mouse, etc.) that can be used to receive user input, a display device (e.g., screen, monitor, etc.) and/or a combined input and display device, that can be used to provide graphical and/or visual output.

For ease of illustration, FIG. 7 shows one block for each of processor 702, memory 704, I/O interface 706, and software blocks of operating system 708 and virtual experience application 710. These blocks may represent one or more processors or processing circuitries, operating systems, memories, I/O interfaces, applications, and/or software engines. In other implementations, device 700 may not have all of the components shown and/or may have other elements including other types of elements instead of, or in addition to, those shown herein. While the virtual experience server 102 is described as performing operations as described in some implementations herein, any suitable component or combination of components of virtual experience server 102 or similar system, or any suitable processor or processors associated with such a system, may perform the operations described.

A user device can also implement and/or be used with features described herein. Example user devices can be computer devices including some similar components as the device 700, e.g., processor(s) 702, memory 704, and I/O interface 706. An operating system, software and applications suitable for the client device can be provided in memory and used by the processor. The I/O interface for a client device can be connected to network communication devices, as well as to input and output devices, e.g., a microphone for capturing sound, a camera for capturing images or video, a mouse for capturing user input, a gesture device for recognizing a user gesture, a touchscreen to detect user input, audio speaker devices for outputting sound, a display device for outputting images or video, or other output devices. A display device within the audio/video input/output devices 714, for example, can be connected to (or included in) the device 700 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

One or more methods described herein (e.g., methods 400 and/or 500) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating systems.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

The functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

The invention claimed is:

1. A computer-implemented method to transmit application data over a network connection, the method comprising:

receiving application data from each application of a plurality of applications, wherein the application data comprises a plurality of datagrams;

determining a permitted data rate for each application of the plurality of applications based on a connection bit rate of the network connection and an allocation ratio that apportions available bandwidth of the network connection between the plurality of applications;

shaping the application data received from each application of the plurality of applications based on the permitted data rate for the application into respective shaped application data;

adding the shaped application data associated with each application to a queue;

assigning the datagrams included in the queue to a particular data stream of a plurality of data streams based on metadata associated with each datagram;

applying stream level flow control to each data stream of the plurality of data streams to identify a subset of datagrams from the each data stream in the queue;

generating a packet for transmission over the network connection, wherein the packet includes the subset of datagrams from at least two data streams of the plurality of data streams; and transmitting the packet over the network connection.

2. The computer-implemented method of claim 1, wherein the allocation ratio that apportions available bandwidth of the network connection between the plurality of applications is based on a respective level of latency tolerance of each application of the plurality of applications.

3. The computer-implemented method of claim 1, wherein assigning datagrams included in the queue to the particular data stream of the plurality of data streams based on metadata associated with each datagram comprises classifying the datagrams in the queue based on one or more of a reliability indicator and a priority indicator associated with the datagrams.

4. The computer-implemented method of claim 1, further comprising, prior to applying the stream level flow control to each data stream of the plurality of data streams, applying connection level flow control to the network connection to determine a connection level data rate for the network connection.

5. The computer-implemented method of claim 1, wherein the plurality of applications includes at least a first application and a second application, and wherein application data received from the first application includes a first set of datagrams with a first level of latency tolerance and wherein application data received from the second application includes a second set of datagrams with a second level of latency tolerance.

6. The computer-implemented method of claim 1, wherein applying the stream level flow control to each data stream of the plurality of data streams comprises skipping one or more blocked data streams such that no datagrams from the blocked data streams are included in the subset of datagrams.

7. The computer-implemented method of claim 1, wherein each datagram of the plurality of datagrams has a stream identifier associated with a traffic class.

8. The computer-implemented method of claim 1, wherein shaping the application data received from each application comprises adding a metered quantity of the received application data that corresponds to the permitted data rate to the queue.

9. The computer-implemented method of claim 1, wherein adding the shaped application data associated with each application to a queue comprises adding the shaped application data associated with each application to a blended queue that includes datagrams received from at least one other application of the plurality of applications.

10. A non-transitory computer-readable medium with instructions stored thereon that, responsive to execution by a processing device, cause the processing device to perform operations comprising:

- receiving application data from each application of a plurality of applications, wherein the application data comprises a plurality of datagrams;
- determining a permitted data rate for each application of the plurality of applications based on a connection bit rate of a network connection and an allocation ratio that apportions available bandwidth of the network connection between the plurality of applications;
- shaping the application data received from each application of the plurality of applications based on the permitted data rate for the application into respective shaped application data;
- adding the shaped application data associated with each application to a queue;
- assigning the datagrams included in the queue to a particular data stream of a plurality of data streams based on metadata associated with each datagram;
- applying stream level flow control to each data stream of the plurality of data streams to identify a subset of datagrams from the each data stream in the queue;
- generating a packet for transmission over the network connection, wherein the packet includes the subset of datagrams from at least two data streams of the plurality of data streams; and
- transmitting the packet over the network connection.

11. The non-transitory computer-readable medium of claim 10, wherein the allocation ratio that apportions available bandwidth of the network connection between the plurality of applications is based on a respective level of latency tolerance of each application of the plurality of applications.

12. The non-transitory computer-readable medium of claim 10, wherein assigning datagrams included in the queue to the particular data stream of the plurality of data streams based on metadata associated with each datagram comprises classifying the datagrams in the queue based on one or more of a reliability indicator and a priority indicator associated with the datagrams.

13. The non-transitory computer-readable medium of claim 10, wherein the operations further comprise, prior to applying the stream level flow control to each data stream of the plurality of data streams, applying connection level flow control to the network connection to determine a connection level data rate for the network connection.

14. The non-transitory computer-readable medium of claim 10, wherein adding the shaped application data associated with each application to a queue comprises adding the shaped application data associated with each application to a blended queue that includes datagrams received from at least one other application of the plurality of applications.

15. A system comprising:

- a memory with instructions stored thereon; and
- a processing device, coupled to the memory, the processing device configured to access the memory and execute the instructions, wherein the instructions cause the processing device to perform operations comprising:
- receiving application data from each application of a plurality of applications, wherein the application data comprises a plurality of datagrams;
- determining a permitted data rate for each application of the plurality of applications based on a connection bit rate of a network connection and an allocation ratio that apportions available bandwidth of the network connection between the plurality of applications;
- shaping the application data received from each application of the plurality of applications based on the permitted data rate for the application into respective shaped application data;
- adding the shaped application data associated with each application to a queue;
- assigning the datagrams included in the queue to a particular data stream of a plurality of data streams based on metadata associated with each datagram;
- applying stream level flow control to each data stream of the plurality of data streams to identify a subset of datagrams from the each data stream in the queue;
- generating a packet for transmission over the network connection, wherein the packet includes the subset of datagrams from at least two data streams of the plurality of data streams; and
- transmitting the packet over the network connection.

16. The system of claim 15, wherein the allocation ratio that apportions available bandwidth of the network connection between the plurality of applications is based on a respective level of latency tolerance of each application of the plurality of applications.

17. The system of claim 15, wherein the operations further comprise, prior to applying the stream level flow control to each data stream of the plurality of data streams, applying connection level flow control to the network connection to determine a connection level data rate for the network connection.

18. The system of claim 15, wherein adding the shaped application data associated with each application to a queue comprises adding the shaped application data associated with each application to a blended queue that includes datagrams received from the plurality of applications.

19. The system of claim 15, wherein the plurality of applications includes at least a first application and a second application, and wherein application data received from the first application includes a first set of datagrams with a first level of latency tolerance and wherein application data received from the second application includes a second set of datagrams with a second level of latency tolerance.

20. The system of claim 15, wherein applying the stream level flow control to each data stream of the plurality of data streams comprises skipping one or more blocked data streams such that no datagrams from the blocked data streams are included in the subset of datagrams.

* * * * *